United States Patent
Ku et al.

(10) Patent No.: US 10,915,223 B2
(45) Date of Patent: Feb. 9, 2021

(54) MOBILE TERMINAL AND METHOD FOR CONTROLLING THE SAME

(71) Applicant: LG ELECTRONICS INC., Seoul (KR)

(72) Inventors: Hyerim Ku, Seoul (KR); Juhye Lee, Seoul (KR); Minhun Kang, Seoul (KR); Minkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 15/866,276

(22) Filed: Jan. 9, 2018

(65) Prior Publication Data
US 2018/0348992 A1    Dec. 6, 2018

(30) Foreign Application Priority Data
Jun. 1, 2017   (KR) ........................ 10-2017-0068619

(51) Int. Cl.
| | | |
|---|---|---|
| G06F 3/0481 | (2013.01) | |
| H04N 21/472 | (2011.01) | |
| G06F 3/041 | (2006.01) | |
| G06F 3/0488 | (2013.01) | |
| G06F 3/0484 | (2013.01) | |
| G11B 27/031 | (2006.01) | |
| H04N 5/232 | (2006.01) | |
| H04N 1/21 | (2006.01) | |

(52) U.S. Cl.
CPC ........ *G06F 3/04817* (2013.01); *G06F 3/0414* (2013.01); *G06F 3/0416* (2013.01); *G06F 3/0488* (2013.01); *G06F 3/04847* (2013.01); *G11B 27/031* (2013.01); *H04N 1/212* (2013.01); *H04N 5/23293* (2013.01); *H04N 5/232933* (2018.08); *H04N 21/47217* (2013.01)

(58) Field of Classification Search
CPC ............... G06F 3/0488; G11B 27/031; H04N 5/23293; H04N 5/232933; H04N 1/212
See application file for complete search history.

(56) References Cited

U.S. PATENT DOCUMENTS

| | | | | |
|---|---|---|---|---|
| 2010/0321406 | A1* | 12/2010 | Iwase ................. | G06F 3/04812 345/638 |
| 2012/0050185 | A1* | 3/2012 | Davydov ............ | G06F 3/04883 345/173 |
| 2012/0183271 | A1* | 7/2012 | Forutanpour .......... | H04N 5/772 386/224 |
| 2012/0274662 | A1* | 11/2012 | Kim ...................... | G06F 3/0414 345/650 |
| 2014/0026051 | A1* | 1/2014 | Roh ....................... | G06F 16/743 715/720 |

(Continued)

*Primary Examiner* — Amy Ng
*Assistant Examiner* — Sajeda Muhebbullah
(74) *Attorney, Agent, or Firm* — Lee Hong Degerman Kang & Waimey

(57) ABSTRACT

The present invention relates to a terminal and a method of controlling the same. A terminal according to an embodiment of the present invention includes a touchscreen, and a controller configured to cause the touchscreen to display video at a reproduction speed, cause the touchscreen to display a first icon, capture the displayed video according to a touch received at the first icon, and adjust the reproduction speed of the video according to a degree of the touch.

15 Claims, 25 Drawing Sheets

(56) References Cited

U.S. PATENT DOCUMENTS

| | | | |
|---|---|---|---|
| 2014/0071323 A1* | 3/2014 | Yi | G06F 3/04883 |
| | | | 348/333.01 |
| 2014/0153908 A1* | 6/2014 | Murakami | H04N 5/4403 |
| | | | 386/343 |
| 2014/0376887 A1* | 12/2014 | Tijssen | G11B 27/34 |
| | | | 386/282 |
| 2015/0070525 A1* | 3/2015 | Rajagopalan | H04N 5/23216 |
| | | | 348/222.1 |
| 2016/0092737 A1* | 3/2016 | Laska | G06F 3/0488 |
| | | | 715/721 |
| 2016/0104507 A1* | 4/2016 | Pourbaba | H04N 5/772 |
| | | | 386/225 |
| 2016/0216871 A1* | 7/2016 | Stamatiou | G06F 3/04845 |
| 2016/0269674 A1* | 9/2016 | Rathore | G11B 31/006 |
| 2016/0360116 A1* | 12/2016 | Penha | G06F 3/0487 |
| 2017/0052695 A1* | 2/2017 | Lee | G06F 3/0488 |
| 2017/0180653 A1* | 6/2017 | Kang | H04N 7/0127 |

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0068619, filed on Jun. 1, 2017, the contents of which are incorporated by reference herein in its entirety.

BACKGROUND OF THE INVENTION

1. Field of the Invention

The present invention relates to a mobile terminal capable of performing a moving image capture, and a method of operating the same.

2. Background of the Invention

Terminals may be divided into mobile/portable terminals and stationary terminals according to their mobility. Also, the mobile terminals may be classified into handheld terminals and vehicle mounted terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of moving images or television programs.

As it becomes multifunctional, a mobile terminal can be allowed to capture still images or moving images, play music or video files, play games, receive broadcast and the like, so as to be implemented as an integrated multimedia player.

As one of those examples, a moving image displayed in the terminal may be captured. On the other hand, for a moving image capture, unlike a capture of a still image, a user should select a desired capture area and thereafter set a desired reproduction speed, a desired capture time or the like after completion of the capture. Such editing process causes user inconvenience.

SUMMARY OF THE INVENTION

Therefore, to obviate the problem and other drawbacks, an aspect of the present invention is to provide a mobile terminal, capable of performing a moving image capture more easily and fast, and a method of controlling the same.

Another aspect of the present invention is to provide a mobile terminal, capable of applying a desired editing while performing a moving image capture, and a method of controlling the same.

Another aspect of the present invention is to provide a mobile terminal, capable of variously utilizing a generated captured moving image and providing a convenient display method to a user, and a method of controlling the same.

To achieve these and other advantages and in accordance with the purpose of this specification, as embodied and broadly described herein, there is provided a mobile terminal, including a touchscreen; and a controller configured to: cause the touchscreen to display video at a reproduction speed; cause the touchscreen to display a first icon; capture the displayed video according to a touch received at the first icon; and adjust the reproduction speed of the video according to a degree of the touch.

In one embodiment disclosed herein, wherein the controller is further configured to: cause the touchscreen to display timer information indicating an amount of time of the captured video.

In one embodiment disclosed herein, wherein the controller is further configured to: suspend the capture while continuing to cause the touchscreen to display the video, when the touch at the first icon is released; and cause the touchscreen to display a second icon after the touch at the first icon is released.

In one embodiment disclosed herein, the mobile terminal further comprises a memory; and wherein the controller is further configured to store the captured video in the memory in response to a touch received at the second icon.

In one embodiment disclosed herein, wherein the controller is further configured to terminate the suspending of the capture and capture a portion of the displayed video beginning from a time point of the suspending of the capture, while a further touch is received at the first icon.

In one embodiment disclosed herein, wherein the controller is further configured to: cause the touchscreen to display a graphic object indicating the adjusted reproduction speed; and cause the touchscreen to display a user interface that permits further controlling of the reproduction speed of the video to be captured based on a touch input received at the graphic object.

In one embodiment disclosed herein, wherein the controller is further configured to: generate a first file that includes a first amount of the captured video, wherein the first amount is a first threshold amount of video; and generate a second file that includes a second amount of the captured video, wherein the second amount includes video that begins at a time period that is successive to an end of the first file.

In one embodiment disclosed herein, wherein the controller is further configured to: cause the touchscreen to display a thumbnail image of the first file while the captured video of the second file is being generated.

In one embodiment disclosed herein, wherein the controller is further configured to suspend the capturing of the video of the second file and cause the touchscreen to display an editing screen for the captured video corresponding to the first file, when a touch input is received at the thumbnail image of the first file.

In one embodiment disclosed herein, wherein the touchscreen comprises a first area corresponding to a reproduction area of the video, and a second area corresponding to a preview of the captured video; and wherein the controller is further configured to: identify a start point for further capturing of the video based on a touch input received at a reproduction bar of the video displayed in the first area; and set a capture time of the video based on a touch input applied to the first icon displayed in the second area.

In one embodiment disclosed herein, wherein the controller is further configured to: execute an object tracking mode for providing options for the captured video, when a second touch is applied to at least one of moving objects included in the video; and wherein in the object tracking mode, a graphic object indicating that each of the moving objects is separated from a background image of the video is displayed during the capturing of the video.

In one embodiment disclosed herein, wherein the controller is further configured to: cause the touchscreen to display an editing screen of the captured video when the capturing of the video ends; and cause the touchscreen to display a first graphic object for adjusting each reproduction time point of the moving objects to be different from an original reproduction time point according to a selection of a first option of the editing screen.

In one embodiment disclosed herein, wherein the controller is further configured to: cause the touchscreen to display an editing screen of the captured video when the capture of the video ends; and sequentially set in the editing screen a reproduction order of the moving objects based on the second touch.

In one embodiment disclosed herein, wherein the controller is further configured to: cause the touchscreen to display an editing screen of the captured video when the capturing of the video ends; and cause the touchscreen to display a second graphic object for adjusting a zoom-in speed of a zooming effect to be applied to a background image of the captured video according to a selection of a second option of the editing screen.

In one embodiment disclosed herein, wherein the controller is further configured to: cause the touchscreen to display an option for changing a capturing mode of the video to a recording mode when a user input associated with an extension of a capture range is received during the capturing.

In one embodiment disclosed herein, wherein the controller is further configured to vary a reproduction speed of the captured video based on a drag direction when a touch input applied to the captured video is dragged in either of first and second directions within a reproduction area.

In one embodiment disclosed herein, wherein the first icon is a capture icon.

In one embodiment disclosed herein, wherein the degree of the touch is an amount of contact with the touchscreen.

According to an embodiment of the present invention, the mobile terminal can easily and quickly capture a moving image without specifying a capture area separately, and can intuitively capture only a desired moving image section. In addition, during the capture, an object extraction for providing a reproduction speed of a moving image to be captured, a capture time, and options can be performed at the same time, thereby remarkably reducing a time required for a user's effort and editing. In addition, a display method different from a still image display method can be provided according to moving image characteristics, thereby contributing to user convenience.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
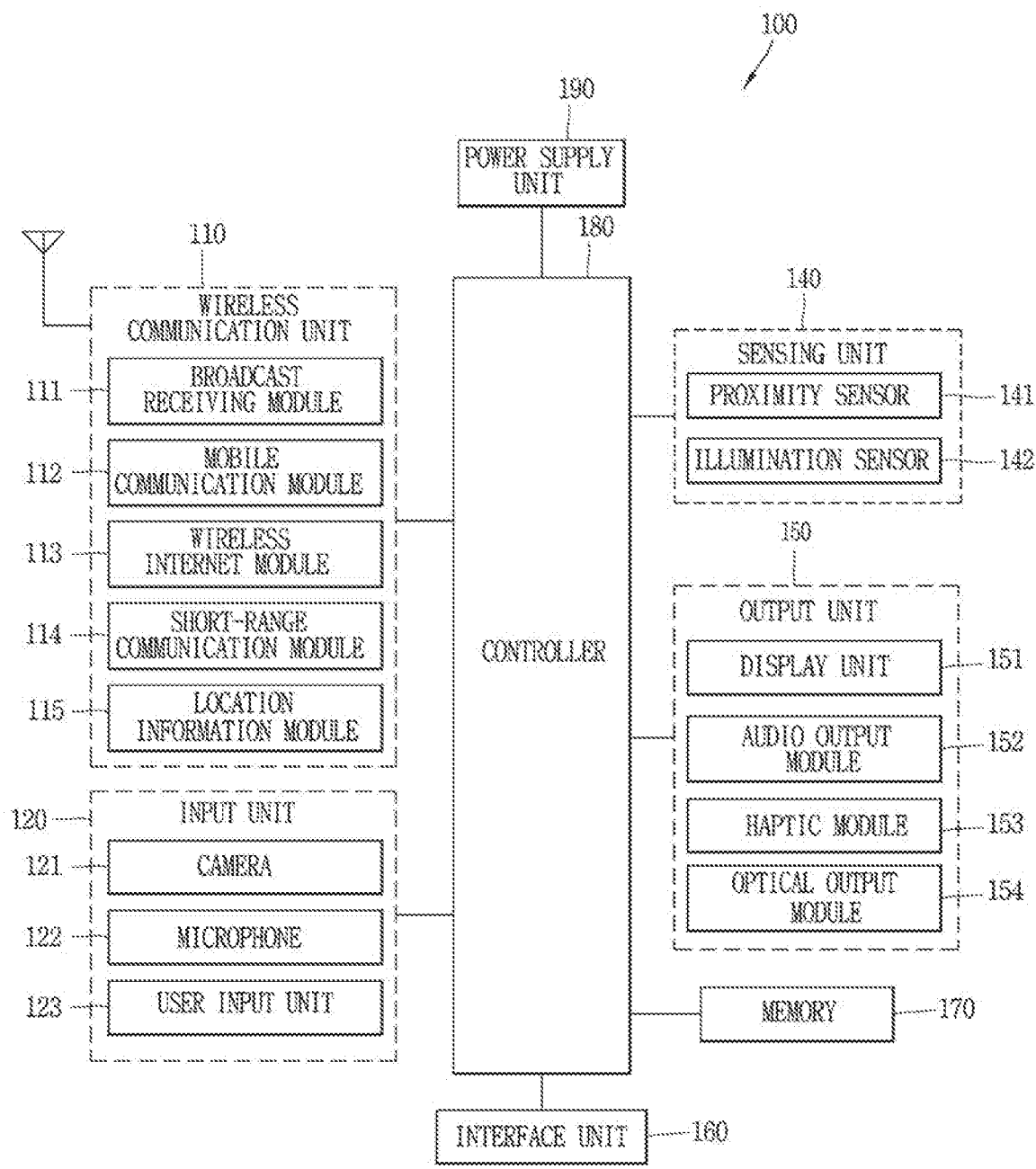
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
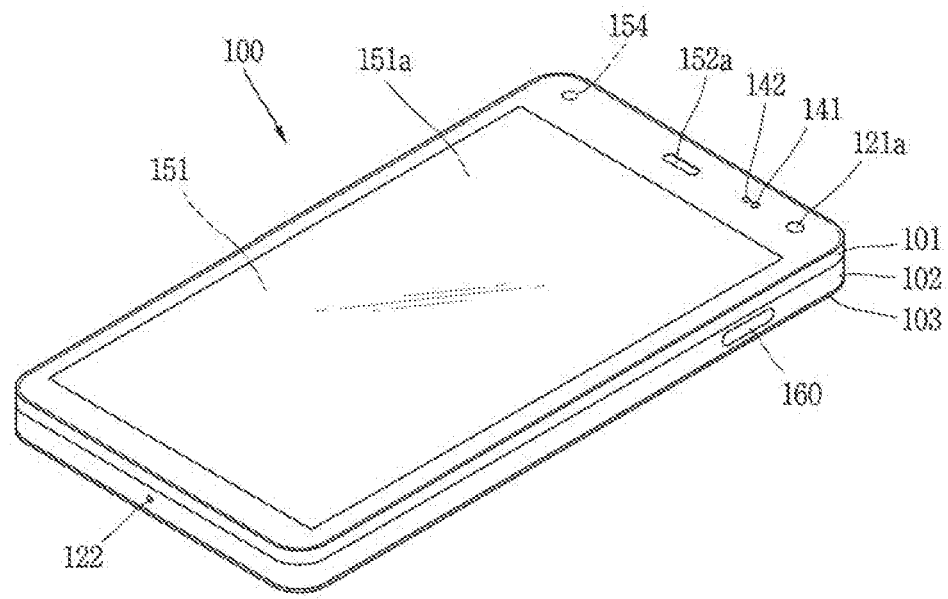
FIGS. 1B and 1C are conceptual views of illustrating one example of a mobile terminal, viewed from different directions.
Figure 1C:
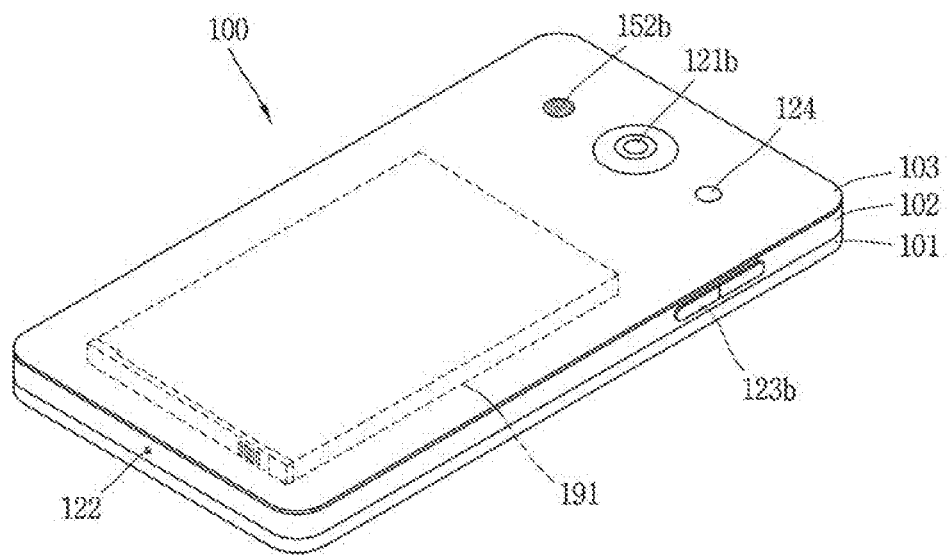

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or moving images obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device. However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not illustrated) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not illustrated) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 according to the embodiment of the present invention may provide a capture icon on one area of the display unit 151, in response to a reception of a moving image (or video) capture command while at least one moving image is reproduced on the display unit 151. The user can easily capture a moving image without having to setting (designating) a capture area, merely by applying a touch to the capture icon. In addition, in the present invention, a reproduction speed of a moving image which is being captured can be differently adjusted by adjusting a touch degree applied to the capture icon while capturing the moving image. Accordingly, the present invention provides user convenience in that a plurality of steps for adjusting a reproduction speed using an editing screen after completely capturing a moving image are simultaneously performed with the moving image capture.

Figure 2:
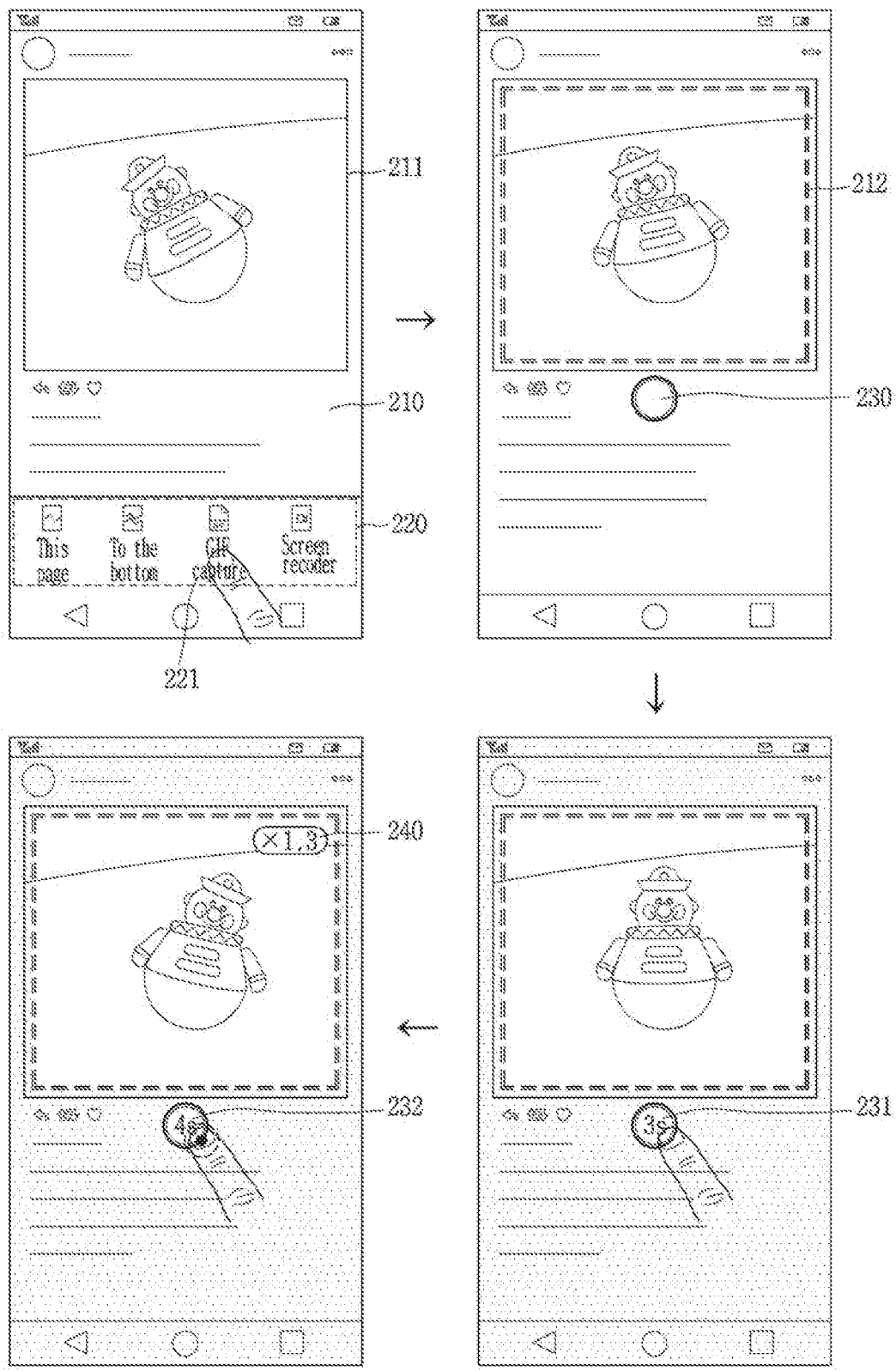
FIG. 2 is a view illustrating in detail an operation implemented in the mobile terminal according to the present invention.

Hereinafter, FIG. 2 is a view illustrating in detail an operation implemented in the mobile terminal according to the present invention.

Referring to FIG. 2, a page 210 including one or more moving images (or videos) 211 may be displayed on the display unit 151 of the mobile terminal 100. Here, the moving image may not be limited to a specific type, and may include every type of moving image stored with an extension, for example, a bitmap, a Joint Photographic Expert Ground (JPEG), a Graphics Interchange Format (GIF), a Portable Network Graphics (PNG), a SWF, GfyCat, avi, wmv, vob, flv, skm, mov, mkv, asf, mpg, mpeg and the like. In addition, as one example, in case where only a still image is normally provided and a moving image is reproduced when a user's proximity touch is applied, or when a currently-reproduced moving image is stopped or terminated, such moving image may also be included in the moving image 211.

In addition, the moving image included in the page 210 may be one as illustrated in FIG. 2, or may be plural though not illustrated. In addition, the moving image 211 may be reproduced while occupying a partial area of the page, or may be reproduced on the entire page, that is, the same moving image reproduction area as the page.

Also, only part of the moving image 211 is included in the page 210, and the rest may appear as a scroll input is applied. In this case, when a capture command described below is received, the controller 180 may recognize even a remaining portion of the moving image that has not been displayed to capture it together, or output a pop-up window that prompts a scroll input.

On the other hand, a menu area 220 for generating a capture command may be output based on a drag input applied to a lower/upper edge area of the display unit 151. The menu area 220 may include a function icon 221 for generating a moving image capture command. When a touch input is applied to the function icon 221, the controller 180 may recognize that the moving image capture command has been input.

In response to such the moving image capture command, the controller 180 may extract the moving image reproduction area included in the displayed page 210. Accordingly, a predetermined frame object 212 may be displayed on an edge area of the extracted moving image reproduction area.

In one embodiment, as described above, the controller 180 may separately extract each moving image even when only a part of the moving image is included in the page 210 or a plurality of moving images are included in the page 210. Specifically, when only a part of a moving image is displayed, a window may be popped up to induce a user's scroll input or to check whether or not to fully capture the partially displayed moving image. Alternatively, when a plurality of moving images are included in the page, a capture command for each of the plurality of moving images may be generated. In this case, a plurality of capture files for the plurality of moving images may be generated, respectively.

In addition, although not illustrated, the moving image capture command may be generated based on a user input specifying a moving image reproduction area to be captured.

For example, when a two-finger touch input is applied to the moving image reproduction area, guide information (e.g., "Drag the area to be captured from an upper left corner to a lower right corner") for specifying the moving image reproduction area to be captured may be popped up. When a drag input is applied to the moving image reproduction area in response to the popped-up guide information, it may be recognized that the moving image capture command has been input and thus the corresponding moving image reproduction area may be extracted.

In addition, the controller 180 may generate a capture icon for the extracted moving image, in response to the moving image capture command. Accordingly, for example, as illustrated in FIG. 2, a capture icon 230 may be displayed adjacent to the extracted moving image reproduction area. At this time, an output position of the capture icon 230 may be determined differently depending on a position of the extracted moving image reproduction area within the page. For example, unlike in FIG. 2, when the extracted moving image reproduction area is located at a bottom of the page, the capture icon may be displayed above the moving image reproduction area or within the moving image reproduction area.

The controller 180 captures a moving image while a touch is applied to the capture icon 230. To this end, when the capture icon is generated, the controller 180 operates a preset capture application to capture the extracted moving image. Then, the operation of the capture application is controlled so as to execute the capture of the moving image, starting from a time point when a touch is applied to the generated capture icon. Accordingly, the user does not need to execute a separate capture program for capturing a specific moving image included in the page.

In addition, the controller 180 may execute a plurality of capture applications or execute a plurality of capture programs within one capture application, to perform an optimized moving image capture by appropriately balancing a plurality of moving image extensions (e.g., WebM and MP4) according to a type of a platform or a currently-reproduced moving image.

Timer information 231 and 232 (e.g., 1s, 2s, 3s, 4s) may be displayed on the capture icon 230 so that a captured time can be known. At this time, the timer information 231 and 232 is not counted any more when a touch applied to the capture icon 230 is released. Also, when a touch is applied again to the touch icon 230 within a predetermined time, the counting may be restarted from a time point when the timer is stopped.

In addition, a bar-like graphic object is displayed along an edge of the capture icon 230 to indicate a capturable time. The bar-like graphic object may be formed such that a length of the graphic object gradually increases along the edge of the capture icon as a capture time elapses, and then a start point and an end point of the graphic object meet with each other when the capturable time becomes 0 (zero).

In addition, the controller 180 may differently adjust a reproduction speed of a moving image to be captured according to a touch degree of a touch applied to the capture icon 230 during the capture of the moving image. Here, the reproduction speed of the captured moving image refers to a speed at which the moving image is repeatedly reproduced according to a user input after the moving image is captured or when the captured moving image is automatically played after uploaded. That is, a current reproduction speed of the moving image remains unchanged, and only a reproduction speed at which the captured moving image is to be reproduced later is changed.

More specifically, as a degree of a touch applied to the capture icon 230 increases, the reproduction speed of the captured moving image may be changed to be fast. On the other hand, as the degree of the touch applied to the capture icon 230 decreases, the reproduction speed of the captured moving image may be changed to be slow. To this end, the capture icon 230 may display thereon a different image corresponding to a touch degree of a touch. Here, the different image may refer to an image with a different color, shape, displayed text, transparency, 3D depth, or the like, for example.

Also, in one area of a reproduction area of a moving image to be captured may be displayed a graphic object indicating a changed (varied) reproduction speed of the moving image to be captured, for example, text 240 (e.g., 1.3 times speed) indicating a changed reproduction speed. Accordingly, the user can visually recognize that the reproduction speed to reproduce the moving image to be captured has changed.

As such, since the adjustment of the reproduction speed of the captured moving image and the moving image capture can be performed simultaneously, the user does not have to manipulate the reproduction speed of the moving image on a separate editing screen after capturing the moving image.

Figure 3:
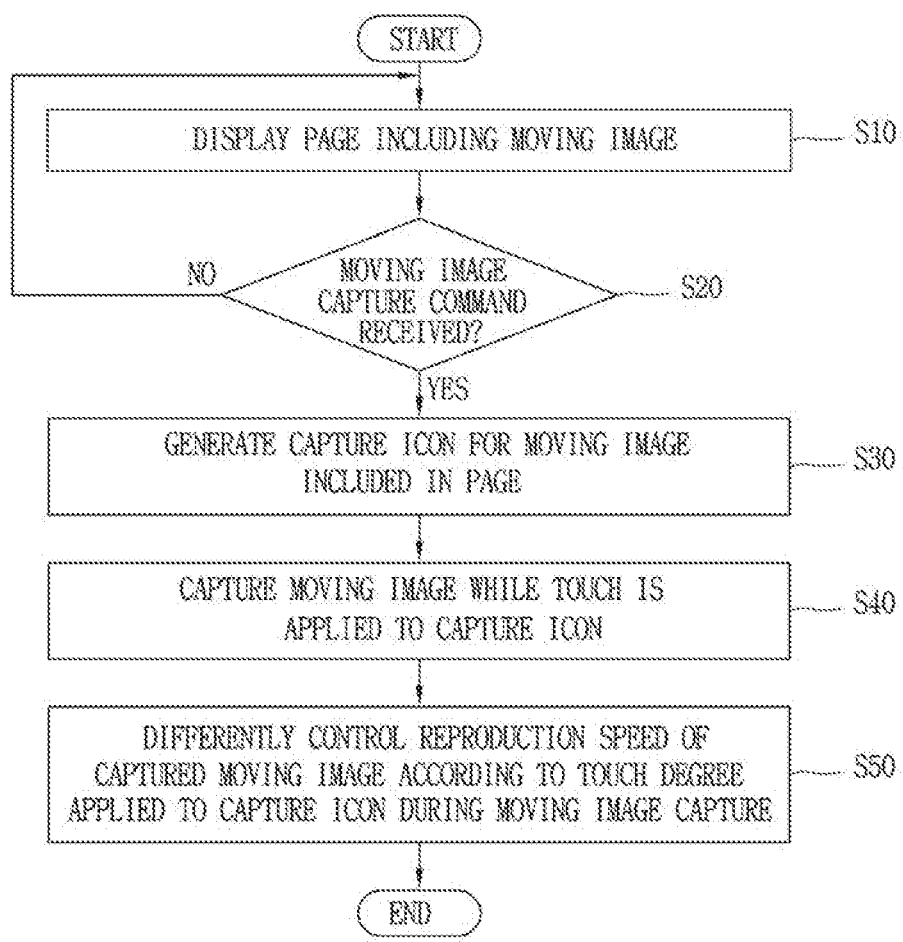
FIG. 3 is a representative flowchart illustrating an operation implemented in a mobile terminal in accordance with the present invention.

FIG. 3 is a representative flowchart illustrating an operation implemented in the mobile terminal according to the present invention.

Referring to FIG. 3, first, a page including a moving image is displayed on the display unit 151 (S10). At this time, only a part of the moving image may be displayed on the page, or a plurality of moving images may be displayed on one page.

In response to a reception of a moving image capture command (S20), the controller 180 generates a capture icon for the moving image included in the page (S30). At this time, the capture icon may be displayed on the page in an overlapping manner, and the other part of the page except a reproduction area of the moving image may be switched to an inactive state while the capture icon is displayed.

Here, the moving image capture command may be implemented in various forms, such as a touch input applied to a specific hard key/sort key, a predetermined voice command, a touch gesture of a predetermined pattern, and the like.

In addition, the controller 180 may operate a predetermined capture program or capture application in a background, in response to the moving image capture command. At this time, an icon indicating that the predetermined capture program/capture application has been operated may be output on a status indication bar disposed on an upper end of the display unit 151.

Next, the controller 180 captures the moving image included in the page while a touch is applied to the capture icon (S40). Specifically, during the reproduction of the moving image, the controller 180 may perform the capture of the moving image while a touch is applied to the touch icon, whereas controlling the operation of the capture program/capture application to suspend the capture of the moving image while the touch applied to the capture icon is released.

In addition, during the capture of the moving image, the controller 180 may control the reproduction speed of the moving image which is captured based on a varied touch degree, in response to the touch degree applied to the capture icon being varied (S50).

Here, controlling the reproduction speed of the moving image which is captured refers to that the reproduction speed of the moving image which is captured/to be captured is changed while maintaining a reproduction state and a reproduction speed of the moving image included in the page. Accordingly, the related art processes of completely capturing the moving image and thereafter changing the reproduction speed using an editing screen can be simultaneously performed in one step.

As described above, according to the embodiment of the present invention, when a moving image is included in a current page, the mobile terminal can easily capture only a part of the moving image through a capture command without switching the page. In addition, a moving image capture and an adjustment of a reproduction speed of the moving image captured can simultaneously be performed without having to enter a separate editing mode, simply by varying a touch degree of a touch input.

Figure 4:
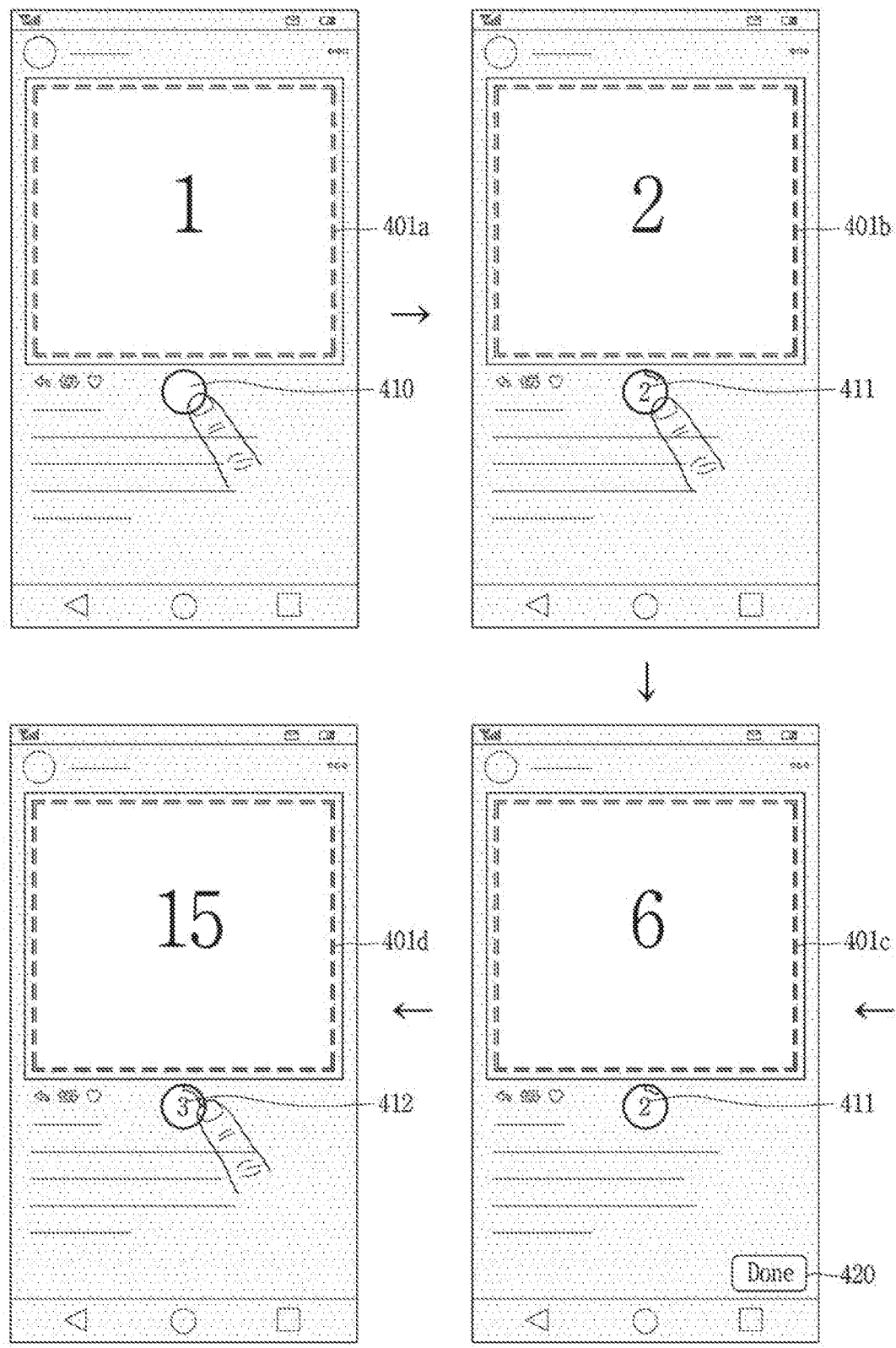
FIGS. 4 and 5 are views illustrating various examples related to controlling a reproduction speed of a capture section of a moving image or a captured moving image using a touch input while capturing the moving image, in a mobile terminal in accordance with the present invention.
Figure 5:
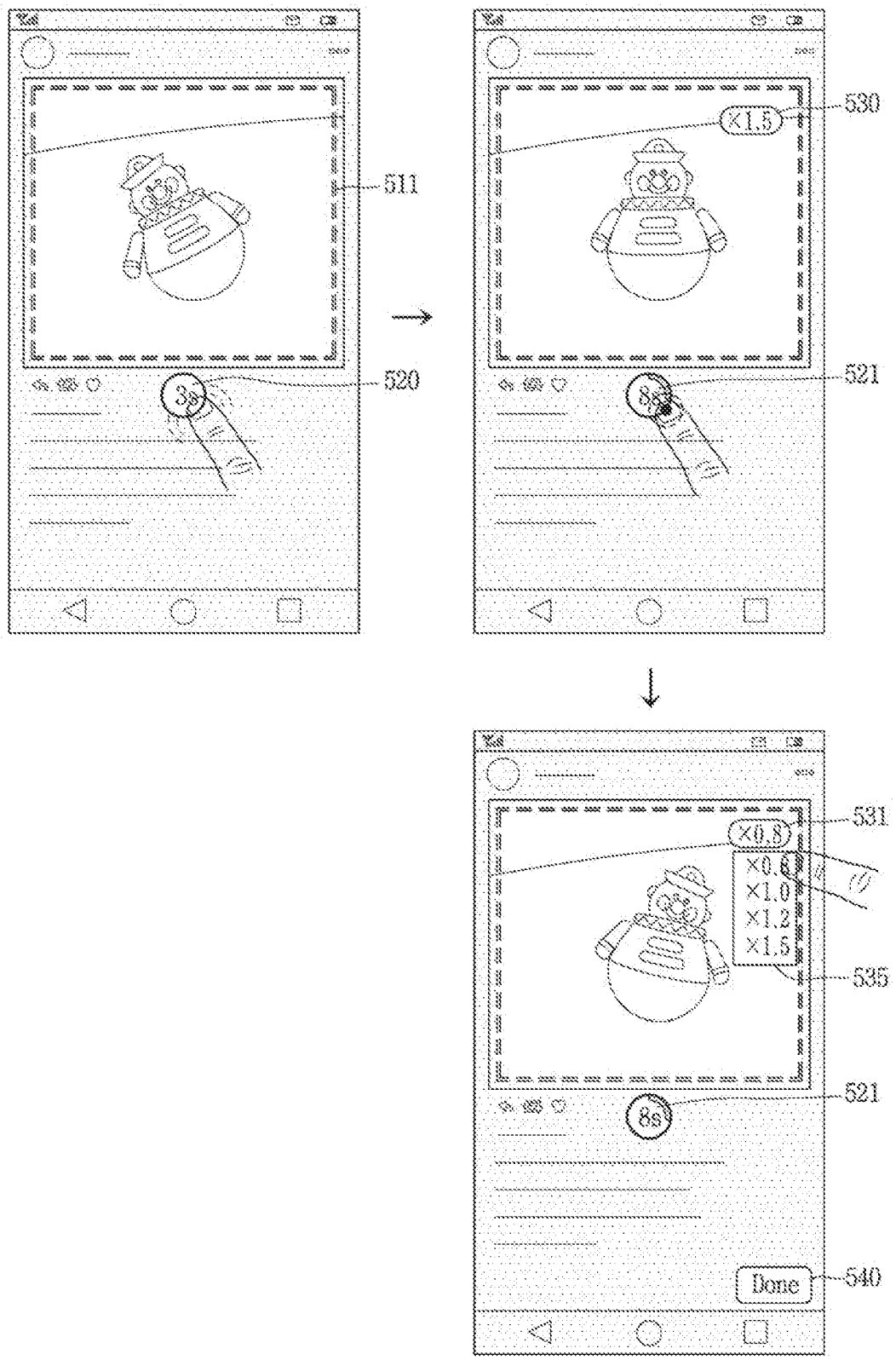

FIGS. 4 and 5 are views illustrating various examples related to controlling a capture section (interval) of a moving image or a reproduction speed of a moving image to be captured using a touch input during a capture of a moving image in a mobile terminal according to the present invention.

Referring to FIG. 4, while a touch is applied to a capture icon 410 with respect to a selected moving image reproduction area 401a, a next still cut 401b of the selected moving image is sequentially captured. At this time, a bar-like graphic object indicating a capturable time is output on an edge of the capture icon 410. In addition, timer information (e.g., number '2') 411 indicating a captured time may be displayed within the capture icon. Meanwhile, the timer information indicating the capturable time and the captured time may also be displayed in a different area of the display unit.

When a touch applied to the capture icon 410 is released, the selected moving image is continuously reproduced (401d), but the capture of the moving image is suspended. Accordingly, the graphic object and the timer information displayed on the capture icon 410 are maintained in a state where they were displayed at the time point when the touch was released.

In addition, a function icon 420 for terminating the capture of the moving image may be displayed in one area of the display unit 151, for example, a lower right side, as the touch applied to the capture icon 410 is released. For example, as illustrated in FIG. 4, a 'Done' soft key may be activated. When the soft key 420 is touched, the moving image capture is terminated and the captured moving image is stored (saved) in a file format.

On the other hand, when a touch is applied again to the touch icon 410, the moving image capture that was suspended is performed again. At this time, the moving image capture is performed again from a time point that the touch is applied again to the capture icon 410. That is, the controller 180 performs the moving image capture from a current time point of the moving image, successive to a still image at a time point when the moving image capture has been suspended, in response to the touch being applied to the capture icon 410 again. Accordingly, as illustrated in FIG. 4, the timer is restarted from a scene '15' of the moving image (for example, '3').

FIG. 5 illustrates another example of changing a repetitive reproduction speed of a moving image to be captured during a moving image capture.

Referring to FIG. 5, when a touch is applied to a capture icon 520 with respect to a selected moving image 511, the moving image is captured and changed timer information is displayed within the capture icon (521).

At this time, when a degree of the touch applied to the capture icon 521 is varied, a graphic object 530 indicating a changed reproduction speed, for example, text information (for example, 1.5 times) is displayed in one area of the display unit 151, e.g., an upper right corner of the moving image 511.

At this time, when the touch input applied to the capture icon 521 is released and a touch input is applied to the graphic object 530 indicating the changed reproduction speed, a user interface 535, for example, a context menu for further controlling a reproduction speed of the currently-captured moving image may be output adjacent to the graphic object 530. A variety of reproduction speeds are displayed in the context menu 535. The user may select a specific reproduction speed to be changed in the context menu 535 and a graphic object 531 reflecting the selected reproduction speed (e.g., 0.8 times) is output. When a touch input is applied to a 'Done' key 540 after changing the reproduction speed, the moving image capture is completed at the changed reproduction speed.

In addition, although not illustrated, in one example, when a touch is applied to the capture icon 521, a control bar for varying the reproduction speed may be output adjacent to the capture icon 521. In this case, a desired reproduction speed may be adjusted by applying a drag touch input to the control bar.

Figure 6A:
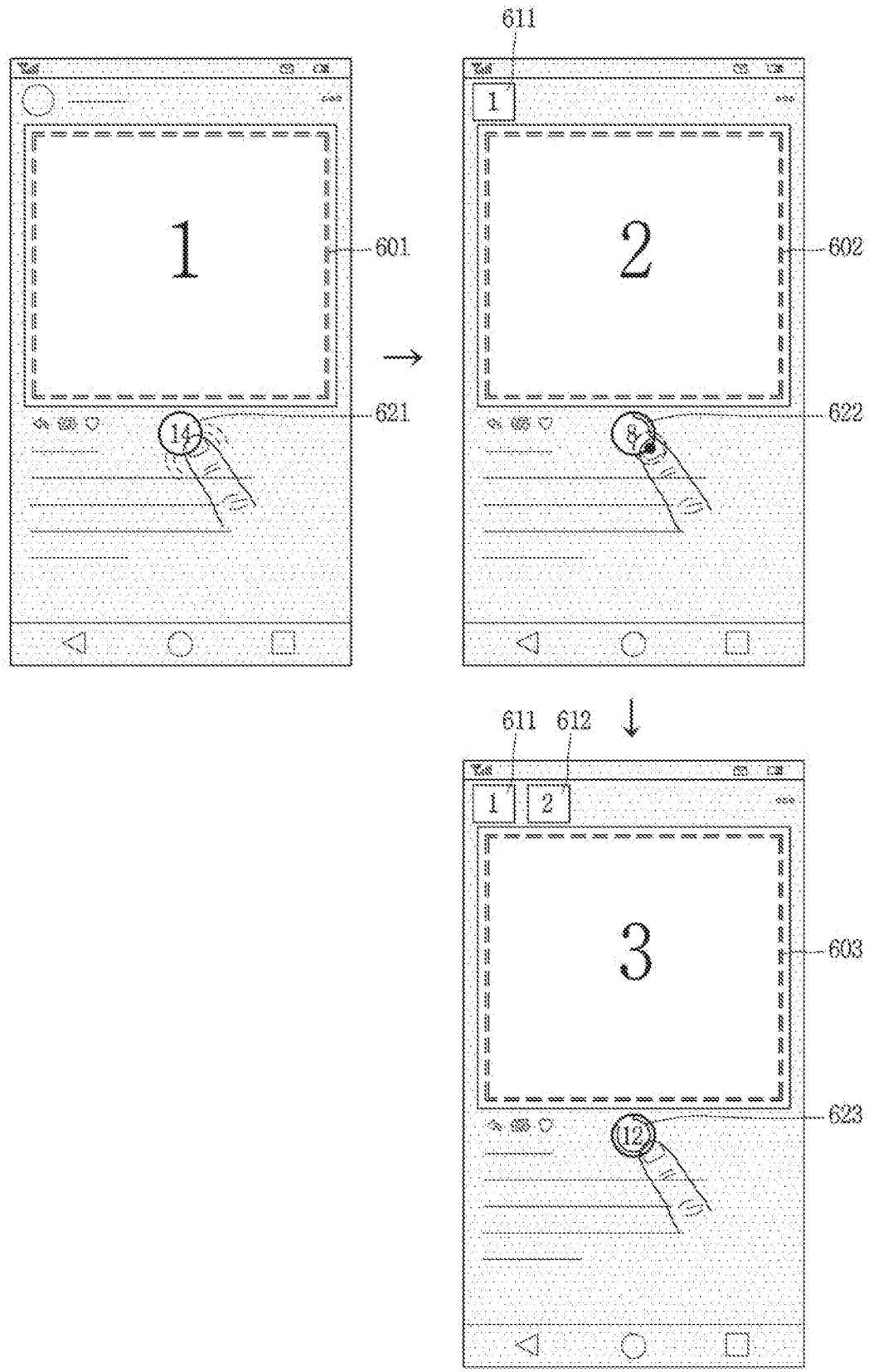
FIGS. 6A and 6B are views illustrating an example related to a consecutive capture of a moving image in a mobile terminal in accordance with the present invention.
Figure 6B:
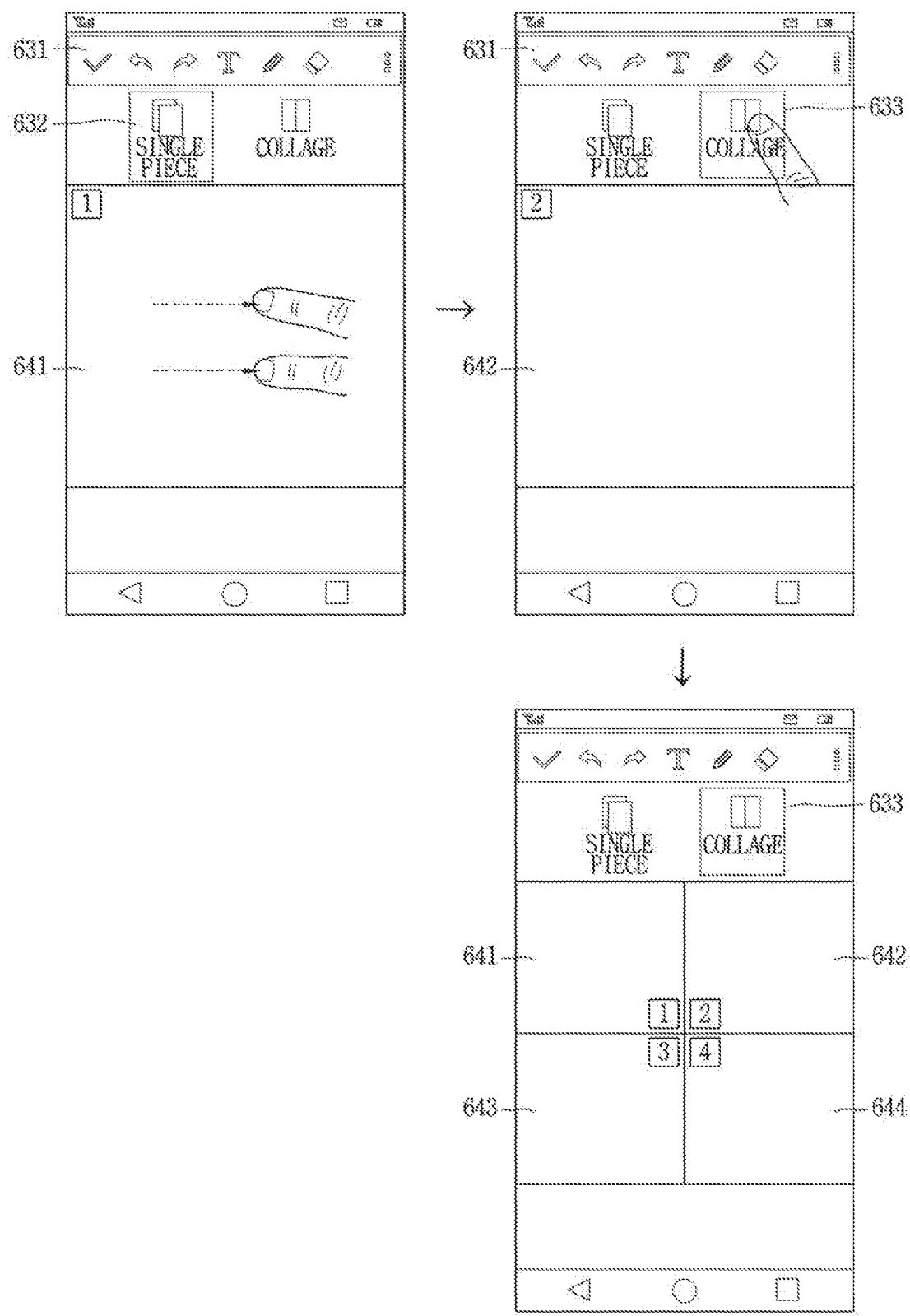

Next, FIGS. 6A and 6B illustrate examples related to a continuous capture of a moving image in a mobile terminal according to the present invention.

A moving image capture has a preset maximum size although slightly different depending on a file format. Therefore, when the preset maximum size is reached during the moving image capture, the captured moving image may preferably be saved (stored) as another file. FIGS. 6A and 6B illustrate examples in which a plurality of files are continuously generated and controlled when an entire size of a captured moving image is difficult to be fully saved in a single file.

Specifically, while a touch is maintained on a capture icon 621 for capturing a moving image in FIG. 6A, the controller 180 may determine whether or not a capturable time of the moving image has been reached. Here, the moving image capturable time refers to a maximum size at which the entire captured moving image can be saved in a single file. As an example, the capturable time is limited to 15 seconds but is not limited thereto.

The controller 180 generates a first file for saving a moving image 601 which is captured for a predetermined capturable time (i.e., 15 seconds) after a touch is applied to the capture icon 621. Then, the count of the captureable time is returned to '0', and a second file for saving a moving image 602 captured for the next capturable time is successively generated in the first file. Accordingly, timer information which has been displayed on the capture icon 621 is also newly counted (622).

While the captured moving image is saved in the second file, a thumbnail image 611 corresponding to the first file may be displayed adjacent to one area of the display unit 151, for example, a capture area 602. Accordingly, the user can recognize that the captured moving image is being continuously saved in another file (i.e., the 'second file').

Even after the capturable time corresponding to the second file is reached, when the touch applied to the capture icon 621 is maintained, a captured moving image 603 is saved in a third file. Then, a thumbnail image 612 corresponding to the second file is displayed side by side with the thumbnail image 611 corresponding to the first file. That is, a display order of the thumbnail images 611 and 612 corresponding to the first and second files corresponds to a file generation order. Timer information 623 which is newly counted is displayed on the capture icon.

Meanwhile, in one embodiment, when the reproduction of the moving image is restarted due to an automatic repetitive reproduction of the moving image, the controller 180 may automatically stop/terminate the generation of the continuous file even if the touch is maintained on the capture icon. Accordingly, even if the user does not accurately know or miss a reproduction end time point of the moving image that is captured, the same section is not unnecessarily repeatedly captured.

When the continuous capture is completed, the user may simultaneously confirm the captured moving images corresponding to the first, second, and third files. In detail, when the touch input applied to the capture icon is released and a touch is applied to a capture end icon (e.g., 'Done' 521), a screen for confirming and editing the generated files may be provided.

Also, although not illustrated, the first, second, and third files may be simply edited even when those thumbnails corresponding to the first, second, and third files are displayed. For example, when a long touch input is applied to the thumbnail image 611 corresponding to the first file, an indication (e.g., 'x') indicating that the file can be deleted may be displayed. Alternatively, a saving order of the first file and the second file may be changed using a drag touch input applied to the thumbnail image 611 corresponding to the first file.

Also, although not illustrated, in one embodiment, when a touch input is applied to a thumbnail image corresponding to a previous file (e.g., the first or second file) which is displayed during the capture corresponding to a continuous file (e.g., a third file), a moving image capture corresponding to the continuous file is stopped, and an editing screen for the captured moving image corresponding to the thumbnail image with the touch input applied thereto is displayed.

FIG. 6B illustrates an example of a screen for confirming and editing continuously-generated files. As illustrated in FIG. 6B, first, a captured moving image 641 which is saved in one of a plurality of the continuously-generated files is displayed. A tool menu bar 631 for editing the displayed captured moving image 641 may be output above the captured moving image 641. At the same time, a viewing menu bar for changing a viewing mode of the continuously-generated files may be provided above the captured moving image 641. For example, the viewing menu bar may include a first viewing mode icon 632 for confirming the continuously-generated files one by one, and a second viewing mode icon 633 for confirming all the continuously-generated files at once.

In an editing screen corresponding to the first viewing mode icon 632, the editing (e.g., resolution, reproduction speed) for each of the captured moving images saved in the single file may be performed differently.

When a preset touch gesture is applied to the display unit 151 in a state that the editing screen for the captured moving 641 saved in one of the plurality of files is displayed, the editing screen is switched to an editing screen for a captured moving image 642 saved in a connected previous/next file.

For example, when a preset touch gesture such as a two-finger drag touch input is applied in a horizontal direction to the display unit 151 while the captured moving image 641 saved in the first file is displayed, the display unit 151 outputs thereon the editing screen for the captured moving image 642 saved in the second file.

On the other hand, in the editing screen corresponding to the second viewing mode icon 633, the captured moving images corresponding to the continuously-stored files are sequentially arranged, such that an editing (e.g., resolution, reproduction speed) for the captured moving images can be equally performed at once.

In detail, when the second viewing mode icon 633 displayed on the viewing menu bar is selected, the editing screens for the plurality of captured moving images 641, 642, 643, and 644 stored in the continuously-generated files are simultaneously output on the display unit 151. At this time, the displayed plurality of captured moving images 641, 642, 643, and 644 may be displayed in separately divided areas, respectively, and information (for example, 1, 2, 3, 4) informing the file generation order may be provided in each area.

At this time, it is also possible that the plurality of captured moving images 641, 642, 643, and 644 are generated into a single file by using the editing screen of the plurality of captured moving images 641, 642, 643, and 644. In this case, the resolutions of the captured moving images may be automatically adjusted, considering a limited size of the file.

When a preset touch gesture (for example, a long touch input) is applied to an area of a specific captured moving image 641, 642, 643, or 644 on the editing screen corresponding to the second viewing mode icon 633, the selected captured moving image is displayed in the first viewing mode.

Figure 7A:
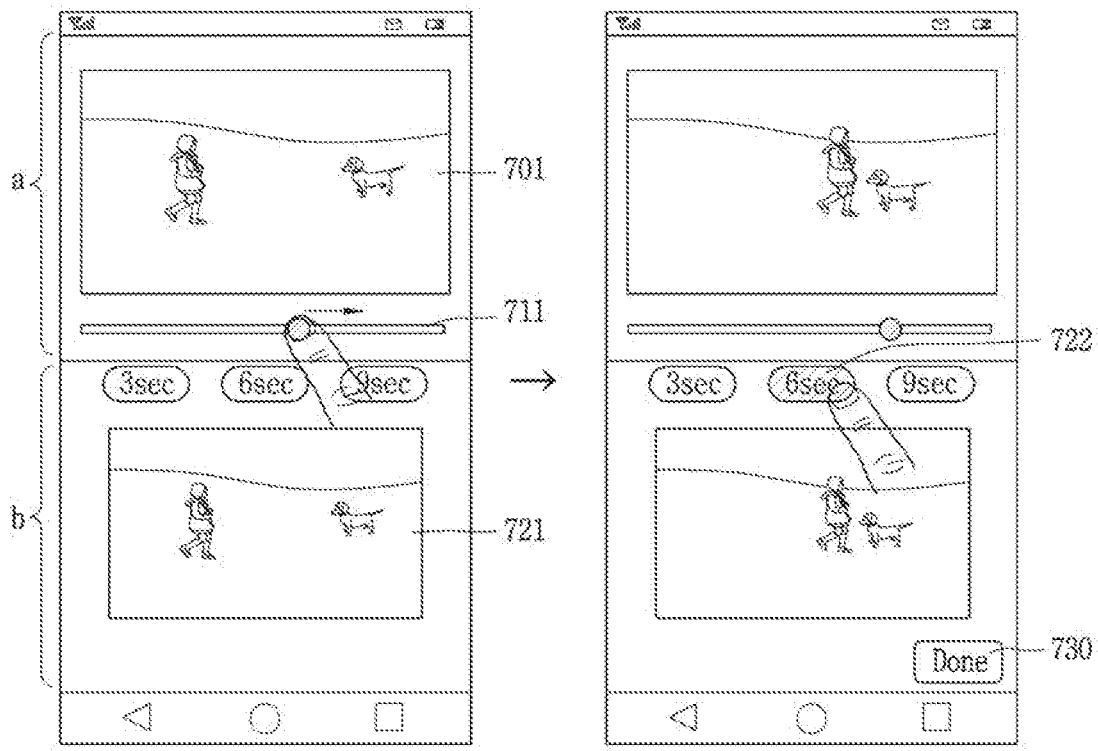
FIGS. 7A and 7B are exemplary views illustrating a method of checking a captured moving image while capturing the moving image or after capturing the moving image in a mobile terminal in accordance with the present invention.
Figure 7B:
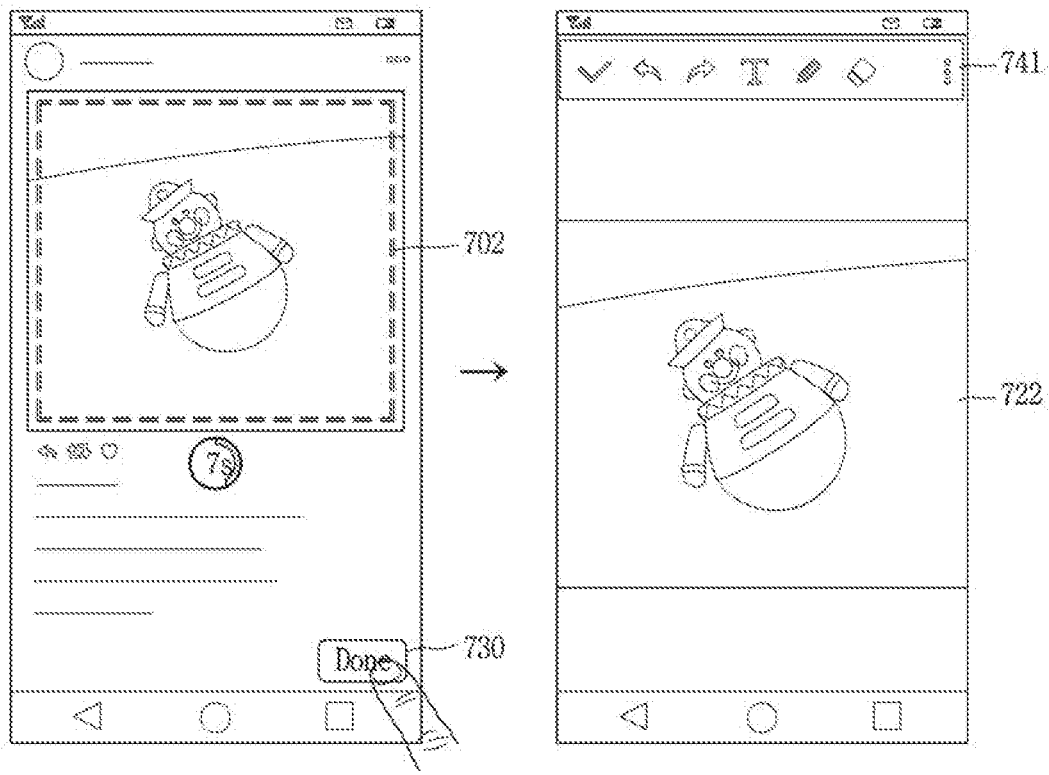

Hereinafter, FIGS. 7A and 7B illustrate examples of different methods for confirming a captured moving image while or after capturing the moving image.

First, FIG. 7A illustrates an example of a screen configuration for viewing a captured moving image while capturing the moving image. To this end, as illustrated in FIG. 7A, when a capture area (hereinafter, referred to as a first area a) corresponding to a moving image reproduction area 701 included in a page is selected on the display unit 151, a preview screen 721 of the captured moving image may be output in the remaining area (hereinafter, referred to as a second area b) of the page except for the selected capture area. At this time, a reproduction time point and reproduction speed of the moving image displayed in the first area a and the reproduction time point and reproduction speed of the captured moving image displayed in the second area b may be different from each other.

A reproduction bar 711 for adjusting the reproduction time of a moving image 701 which is captured may be displayed in the first area a. Accordingly, a reproduction time point selected based on a drag touch input applied to the reproduction bar 711 may be selected as a capture start point.

Also, a user interface for presetting a capture time of the moving image based on a user's touch input may be provided in the second area b.

For example, as illustrated in FIG. 7A, a plurality of capture icons having different capture times may be displayed. In this case, the moving image 701 is captured during a capture time (for example, 6 sec) indicated in a selected capture icon 722, with the reproduction time point selected through the reproduction bar 711 as the capture start point. When the capture time of six seconds indicated in the selected capture icon 722 elapses, the capture is automatically terminated. However, when a touch is applied to a capture end icon ('Done') 730 even if the capture time indicated in the selected capture icon 722 elapses, the capture may be immediately terminated.

Alternatively, as another example, a capture time may be set by applying a drag input rotating in one direction to the capture icon, or may be set in response to a drag input by providing a bar-type indicator which is distinguished from the capture icon.

When the capture time is set as described above, the captured moving image captured during the set capture time is repeatedly reproduced in the second area b. Accordingly, the user can simultaneously view the captured moving image while capturing the moving image within one screen.

When it is desired to further increase the length of the captured moving image, a capture icon having a capture time longer (e.g., 9 seconds) than the previous one may further be selected in the second area b. Then, the capture is performed continuously from the reproduction time point corresponding to the point where 6 seconds have elapsed, and the captured moving image may be modified into a connected captured moving image of 9 seconds. Conversely, when it is desired to reduce the length of the captured moving image, it may be realized by further selecting a capture icon having a capture time shorter (e.g., 3 seconds) than the previous one.

As another example, when it is desired to change a capture section (interval) of the moving image according to the confirmation result, the capture start point may be selected again using the reproduction bar 711 provided in the first area a. Afterwards, the capture icon may be selected again in the second region b to change the capture interval differently. In this case, the capture may be performed again in a manner of overwriting the file of the previously-stored captured moving image.

FIG. 7B illustrates an example of a screen configuration for confirming a captured moving image after the completion of the moving image capture. When a capture end icon ('Done') 730 is selected at any time during the moving image capture, the moving image capture is ended, and the page is switched to an editing screen 722 of the captured moving image. A tool menu bar 741 for performing editing, such as deletion, clipping, pasting, decorating, etc., with respect to at least a part of the captured moving image is provided in the editing screen 722.

In addition, although not illustrated, when a save (storage) after editing with respect to the captured moving image is selected in the editing screen 722, the editing screen may be switched to the previously-displayed page including the moving image reproduction area.

Hereinafter, FIGS. 8, 9A, 9B, 9C, 10A, and 10B illustrate examples of specific editing methods for moving images captured through the examples described above.

Also, in the following examples, it is assumed that at least one moving object is included in each moving image to be captured. In addition, the examples described below relate to a movement of the object included in the moving image to be captured.

Figure 8:
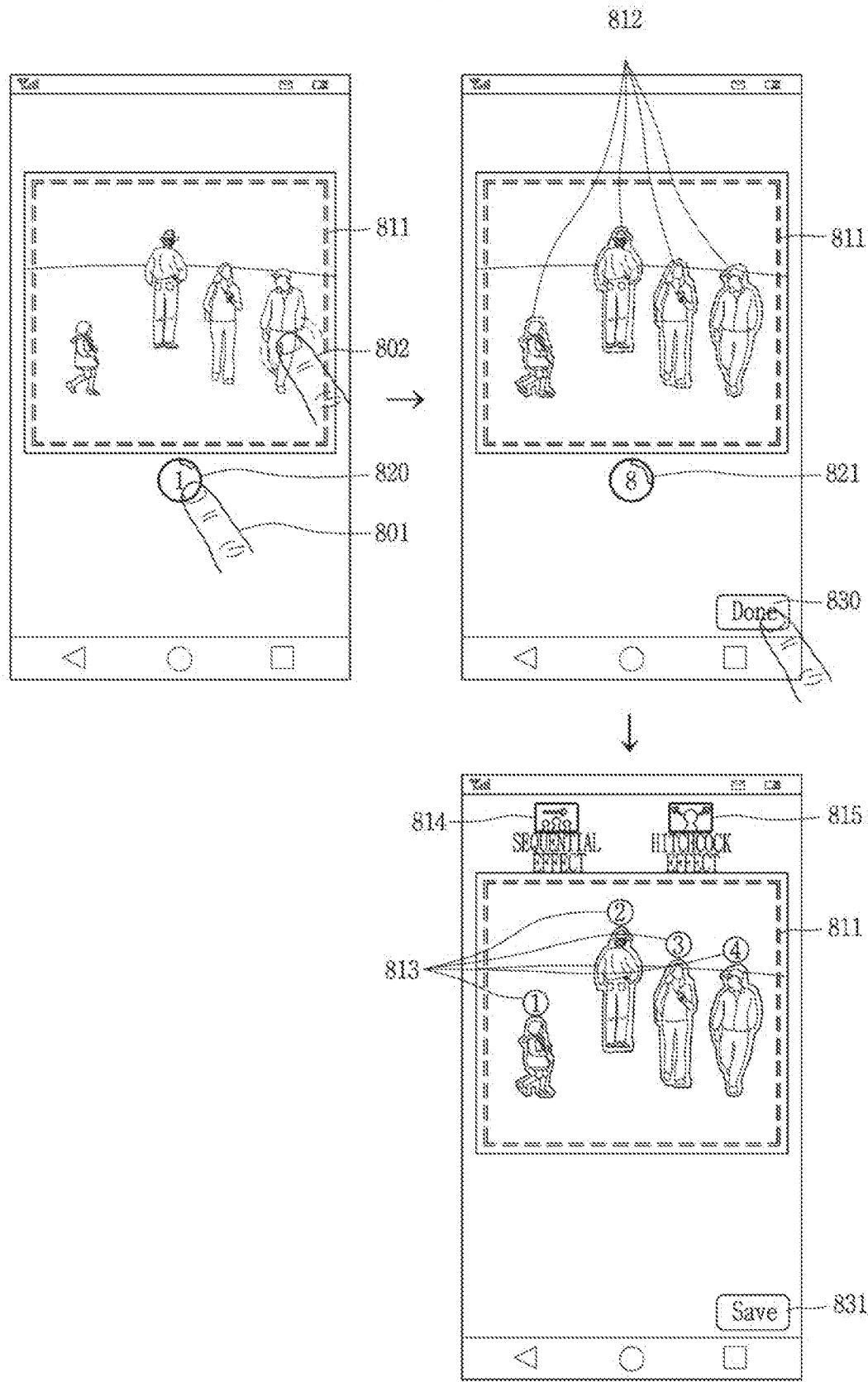
FIGS. 8, 9A, 9B, 9C, 10A and 10B are exemplary views illustrating various editing methods for a captured moving image in a mobile terminal in accordance with the present invention.

Referring to FIG. 8, while a moving image is captured using a touch input applied to a capture icon 820, when a second touch 802 is applied to a specific object included in a moving image 811 which is captured while holding a first touch 801 applied to the capture icon 820, the controller 180 executes an object tracking mode as an option for the captured moving image.

In the object tracking mode, all the objects moving in the moving image as well as the specific object with the second touch applied or other objects of the same type as the specific object are separated from a background image, and attributes of the extracted objects or attribute information (movement sequence, direction, change of facial expression, etc.) related to movement of the objects are continuously recognized. Various options may be applied to the captured moving image using the extracted objects.

To this end, the controller 180 calls a predetermined object recognition algorithm stored in the memory 170 of the mobile terminal 100 to extract and recognize the moving objects in the moving image. The object recognition algorithm is implemented using OpenCV (Open Computer Vision), a facial recognition system, a speaker recognition, FERET (Facial Recognition Technology), AAM (Active Appearance Model) and the like, but the present invention is not limited thereto.

In the object tracking mode, graphic objects indicating that the object tracking mode has been activated may be displayed on the objects separated from the background image of the moving image. For example, as illustrated in FIG. 8, a frame object 812 may be displayed in a silhouette of each of the moving objects. Accordingly, the user can visually view the activation of the object tracking mode and the objects to which a specific option can be applied.

When a moving image capture is ended according to a touch input applied to the moving image capture end icon 830, applicable options are provided on an editing screen of the captured moving image. Examples of the options include a sequential effect function 814 and a Hitchcock effect function 815. In addition, a reproduction order which is decided based on at least one of the attributes related to positions and movement of the extracted objects extracted in response to the activation of the object tracking mode may be displayed on the editing screen. For example, when four subjects are extracted in FIG. 8, a reproduction order may be numbered sequentially, starting from an object located on the left (or right) in the moving image.

Figure 9A:
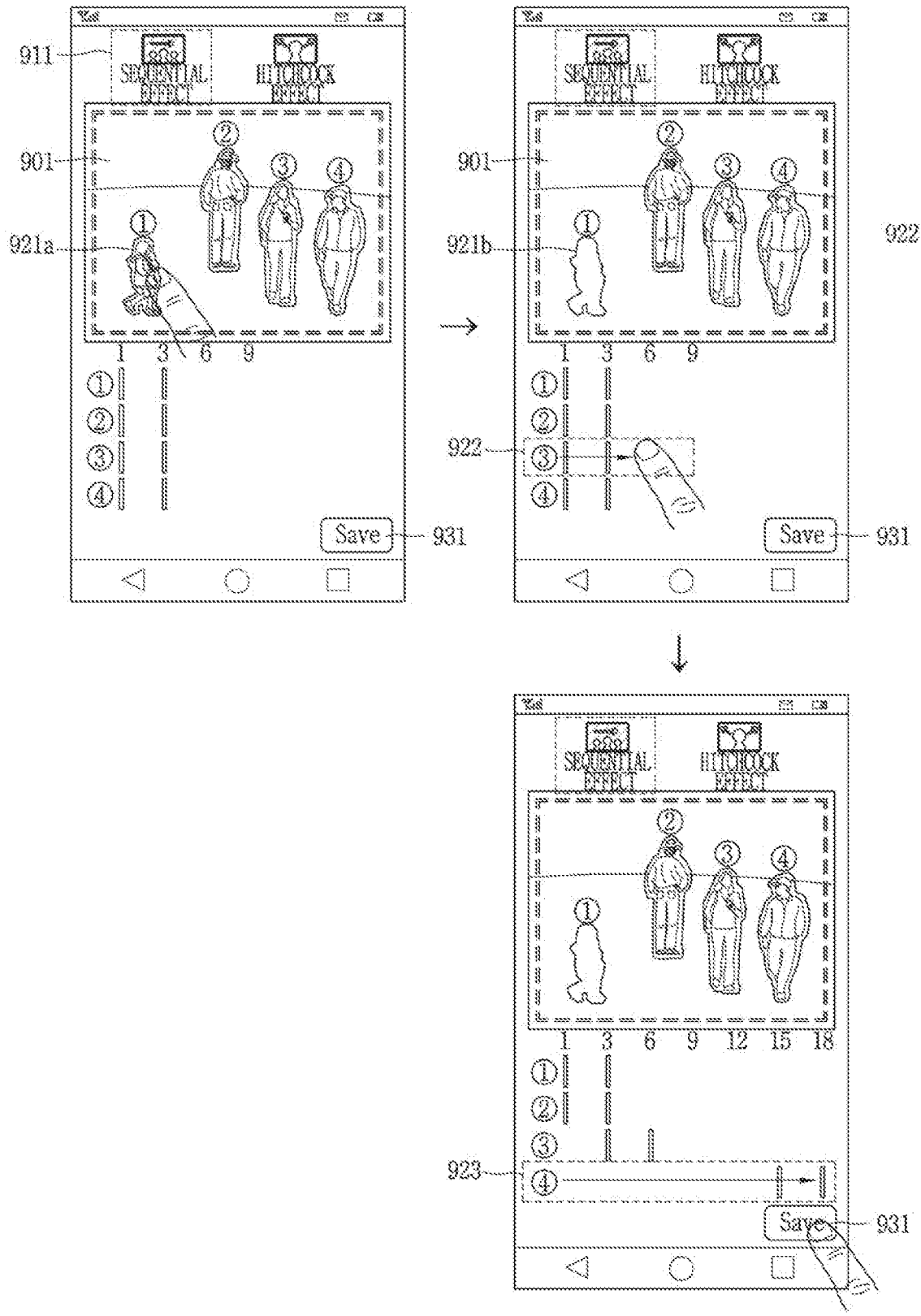
Figure 9B:
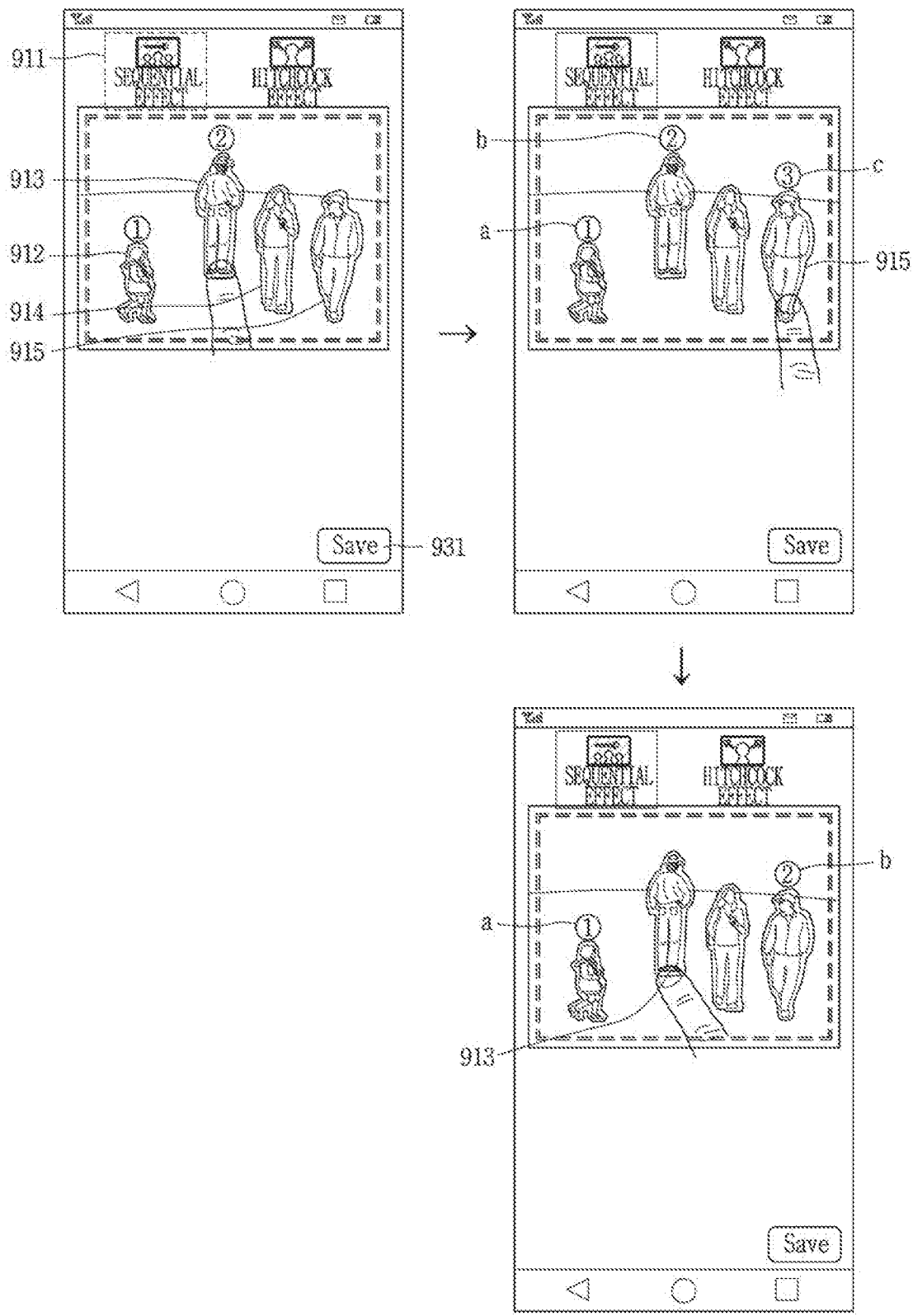

FIGS. 9A and 9B are different examples of applying a sequential effect to extracted objects as an option. When a sequential effect function 911 is selected on an editing screen of a captured moving image 901, a first graphic object for adjusting each reproduction time point of the objects extracted in the object tracking mode to be different from an original reproduction time point, for example, an editing tool for each of the extracted objects may be provided below the captured moving image 901 in a trim form. Then, each of the extracted objects may be displayed with a reproduction order thereof.

For example, when a preset touch input (e.g., a long touch input) is applied to an object 1, the selected object 1 may be deleted from the captured moving image 901.

As another example, when a drag input is applied to a trim 922 corresponding to an object 3, a moving time point of the object 3 may be changed to a time point at which the drag input is released. The trim 923 corresponding to the object 3 may be edited such that the object 3 moves at a timing later than the object 2 by extending a drag length of the drag input to be longer than before. In this manner, a user-desired reproduction timing may be applied to each of the extracted objects. Thereafter, when a save icon 931 is clicked, the object 1 is removed, and the captured moving image in which the object 2, the object 3, and the object 4 sequentially move is repeatedly reproduced.

In this manner, when the reproduction order is determined using the trim for each of the extracted objects, not only the reproduction order but also each timing can be precisely adjusted.

On the other hand, as another example, as illustrated in FIG. 9B, an editing screen to quickly determine a reproduction order of objects without providing an editing tool for each extracted object may be implemented.

Specifically, as illustrated in FIG. 9B, a frame object may be displayed in a silhouette of each of extracted objects 912, 913, 914, and 915 in an editing screen of a captured moving image. In this case, the controller 180 may sequentially set a reproduction order of the moving objects based on touch inputs applied to the extracted objects 912, 913, 914, and 915.

For example, when touch inputs are sequentially applied to the object 1, the object 2, and the object 4 in FIG. 9B, the graphic object a indicating a reproduction at a first timing is output on the object 1, a graphic object b indicating a reproduction at a second timing is output on the object 2, and a graphic object c indicating a reproduction at a third timing is output on the object 4.

At this time, when it is desired to change the reproduction orders of the object 2 and the object 4, the object 2 may additionally be touched to release the set timing order. Accordingly, the graphic object output on the object 3 is changed to the second timing b. Thereafter, when the object 3 is touched again, a graphic object indicating a reproduction of a third timing is sequentially output. On the other hand, the unselected object 3 is reproduced at the original reproduction time point.

According to this embodiment, since there is no need to adjust the trim for each extracted object, the reproduction order for each object can be set more quickly.

Figure 9C:
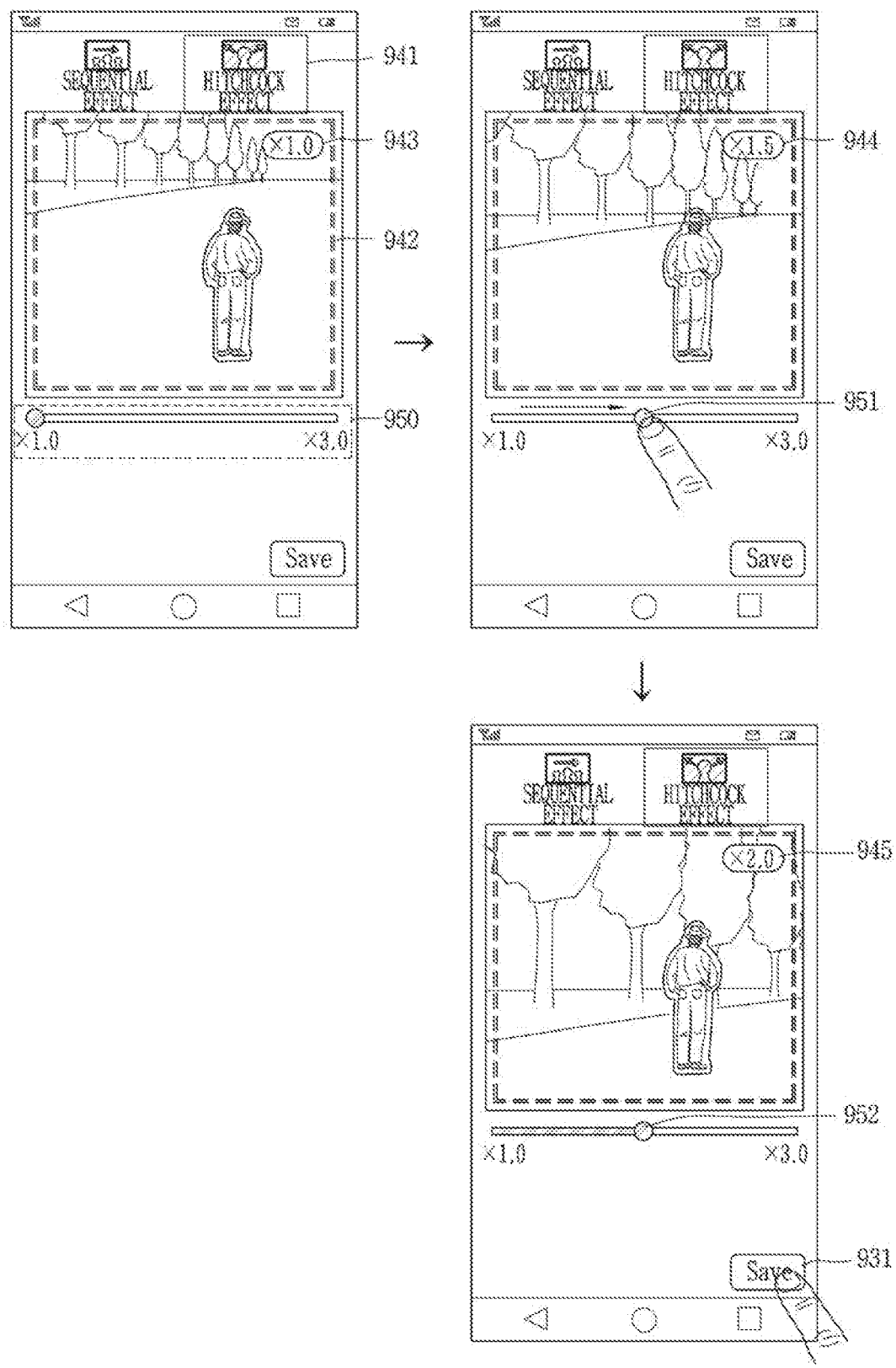

FIG. 9C illustrates an example of applying a specific capturing technique, for example, a Hitchcock effect, to extracted objects as an option.

The Hitchcock effect is one of movie making techniques, and is a visual effect that a camera approaches a subject to be captured along a track while the subject to be captured is pushed out using a zoom lens. Within a frame, the subject remains in the same size, but the background changes in relative size to the subject, which causes a visual distortion effect in which the background suddenly moves away. In other words, it is also called vertigo effect, Hitchcock zoom, dolly zoom, zoom out track in, and the like.

After the execution of the object tracking mode of FIG. 8, when a Hitchcock effect function 941 is selected on an editing screen of the captured moving image 901 as illustrated in FIG. 9C, a second graphic object in a form of an indicator bar 950 for adjusting a zoom-in speed of a zooming effect to be applied to a background image of a captured moving image 942 is provided on the editing screen.

The controller 180 adjusts the zoom-in speed applied to the background image of the captured moving image 942 according to a direction and length of a drag input 951 applied to the indicator bar 950. Information 943, 944, or 945 indicating a varied zoom-in speed is displayed in the captured moving image 901. Thereafter, when a save icon 931 is selected, a zoom-in effect is applied to the background of the captured moving image at a zoom-in speed corresponding to the displayed information 945.

On the other hand, although not illustrated, after the execution of the object tracking mode of FIG. 8, an option of applying a faster reproduction speed or a slower reproduction speed to only the extracted objects may also be provided. Alternatively, at least some of the extracted objects may be copied and pasted so that more objects appear in the captured moving image. Alternatively, the positions of the extracted objects may be changed to any points in the captured moving image, or the extracted objects may be rotated at the same positions to change their postures.

In this manner, by executing the object tracking mode while capturing the moving image, a more extended editing option from editing a reproduction speed or reproduction direction of the captured full moving image.

Figure 10A:
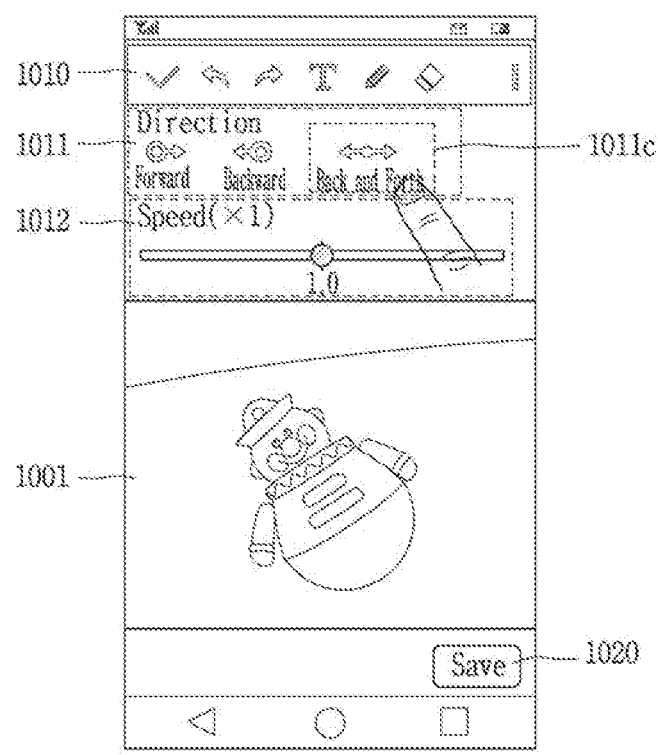
Figure 10B:
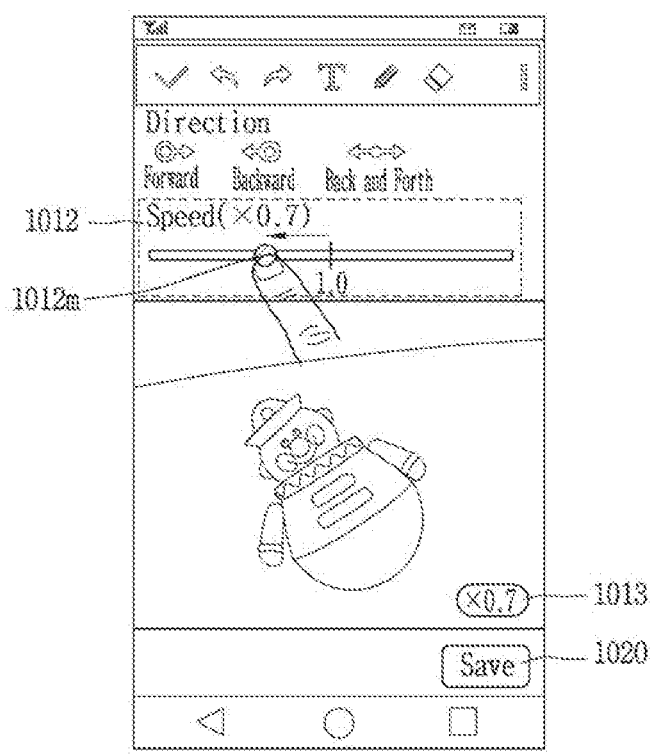

FIGS. 10A and 10B illustrate examples of further controlling a reproduction direction and reproduction speed of a captured moving image using an editing screen after the capture of the moving image is completed.

To this end, as illustrated in FIGS. 10A and 10B, an editing screen of a captured moving image may further provide thereon a first additional menu area 1011 for adjusting the reproduction direction of the captured moving image, and a second additional menu area 1012 for adjusting the reproduction speed of the captured moving image, in addition to tool menus 1010 for editing.

In this instance, as illustrated in FIG. 10A, when a bidirectional production menu 1011c is selected in the first additional menu area 1011, a captured moving image 1001 is reproduced one time in a forward direction and then in a reverse direction in a repetitive manner. When a save icon 1020 is selected, a captured moving image is repeatedly reproduced in a bidirectional manner.

On the other hand, as illustrated in FIG. 10B, a moving member 1012m of an adjustment bar 1012 displayed in the second additional menu area 1012 may be dragged to further control a speed of the captured moving image. In this case, information 1013 indicating a varied reproduction speed is displayed at a bottom of the captured moving image. Thereafter, when the save icon 1020 is selected, a captured moving image which is repeatedly reproduced at the changed reproduction speed is generated.

Figure 11A:
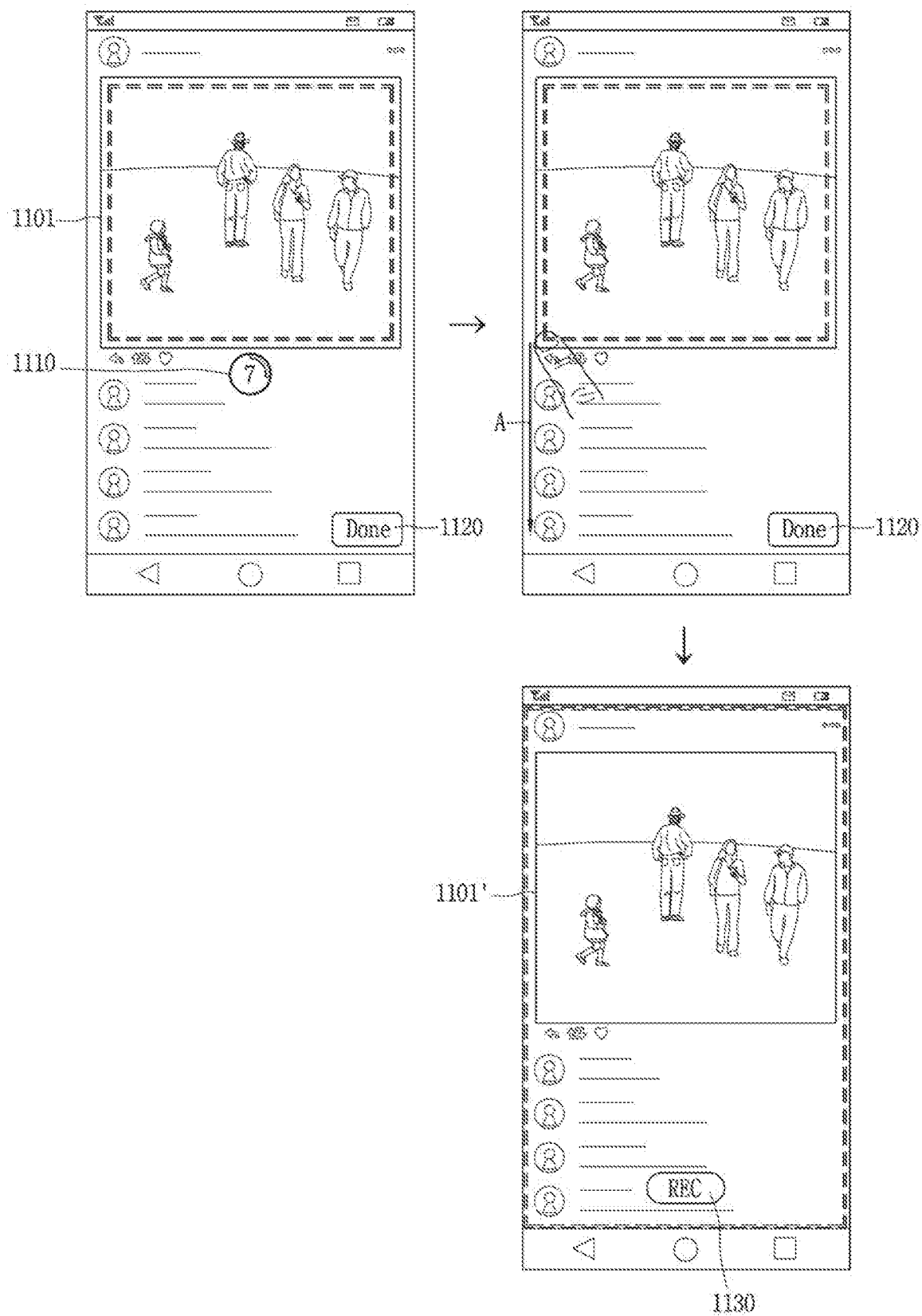
FIGS. 11A and 11B are exemplary views illustrating a method of changing a capturing mode according to a user input for extending a capture range in a mobile terminal in accordance with the present invention.
Figure 11B:
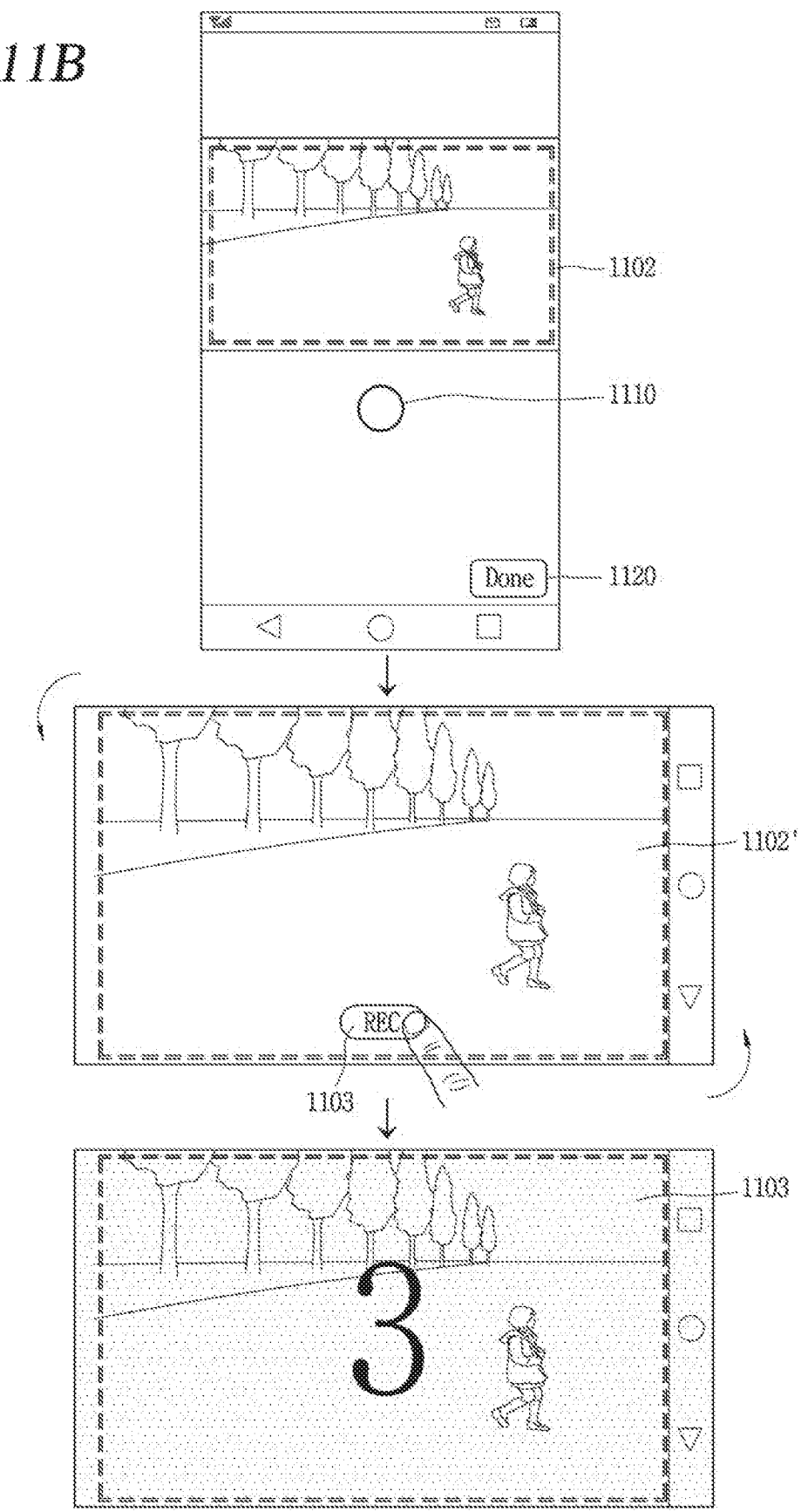

FIGS. 11A and 11B are exemplary views illustrating a method of changing a capturing mode according to a user input that extends a capture range.

In the foregoing embodiments, the moving image capture has been performed by designating the moving image reproduction area included in the part of the page as the capture area. In this manner, there may be a user's need of desiring to reduce a range to be captured or extend the range to the entire page.

For example, in case of desiring to reduce the capture area, when the touch applied to the capture icon and thereafter an edge of the frame 1101 or the capture area output on a boundary area of the capture area is dragged inwardly, the capture area is reduced. Afterwards, when the capture icon 1110 is touched again, a captured moving image for the varied capture area is generated while the touch is maintained.

Meanwhile, it is preferable to execute a screen recording function when the capture area extends to the entire page. Thus, as illustrated in FIG. 11A, when a long touch is applied to the frame 1101 output on the boundary area of the capture area or a touch gesture A pulling the frame 1101 to outside of the moving image while performing the moving image capture, the capture area extends to the entire page. Accordingly, a varied frame 1101' is output on a page boundary area. In this instance, the moving image capture is suspended. An option menu 1130 for changing the capture mode of the moving image to the recording mode may be provided on one area of the display unit 151, for example, on a lower side.

The execution of either the capture mode or the recording mode is toggled according to a touch input to the option menu 1130. That is, even if the capture area extends to the entire page, the capture mode may be maintained according to a user's selection, or the recording mode may be selectively performed by applying a touch to the option menu 1130.

Although not illustrated, even after the capture mode is changed to the recording mode according to the selection of the option menu 1130, when the recording mode is stopped and the capture area is reduced again, the capture mode may be executed again.

FIG. 11B illustrates an example in which an option menu 1103 is provided when a capture area naturally extends according to a user input for changing a display direction of the display unit 151 while a moving image capture is performed. Specifically, when the display unit 151 is rotated in a horizontal direction while the moving image capture is performed with the display unit 151 arranged in a vertical direction, a moving image to be captured extends to the entire display unit 151 and thus a size of a frame 1102' of a boundary area varies. When a recording mode is executed using the option menu 1103, recording starts (1103) after counted by a preset time (e.g., 3, 2, 1).

Hereinafter, various examples utilizing a moving image captured by one of the above-described embodiments will be described.

Figure 12:
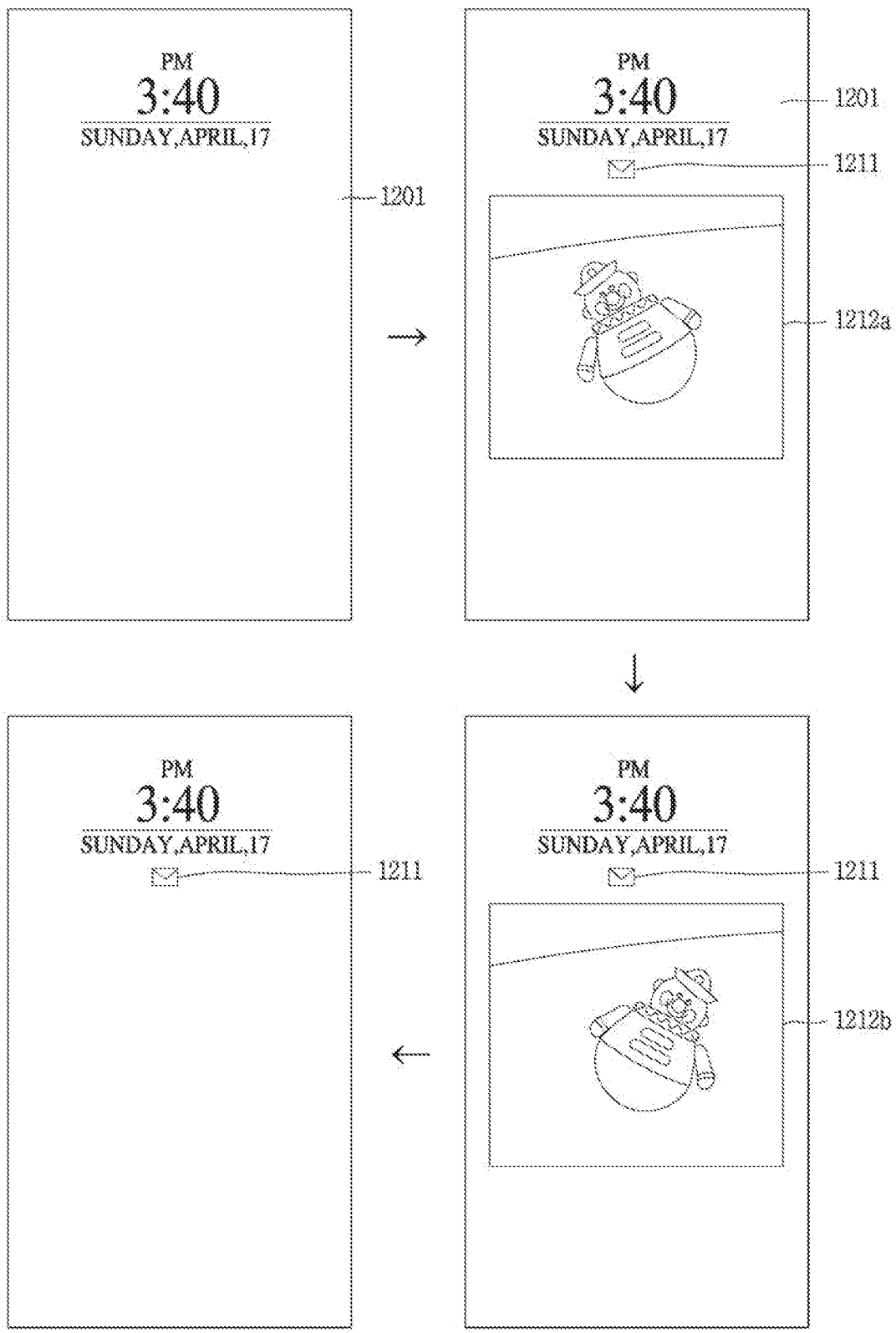
FIGS. 12, 13 and 14 are views illustrating various examples utilizing a captured moving image in a mobile terminal in accordance with the present invention.

First, as illustrated in FIG. 12, a captured moving image may be used as event notification information which is displayed on either a lock screen or an Always On Display (AOD) screen. For example, when a message is received while the AOD screen 1201 is displayed (1211), associated captured moving images 1012a and 1012b as information indicating an arrival of the message may be reproduced instead of message contents. At this time, the captured moving image 1012a to be reproduced may be specified as a moving image related to the received message (e.g., a captured moving image including a message originator). The captured moving images 1012a and 1012b may disappear from the display unit 151 after a predetermined time elapses.

Figure 13:
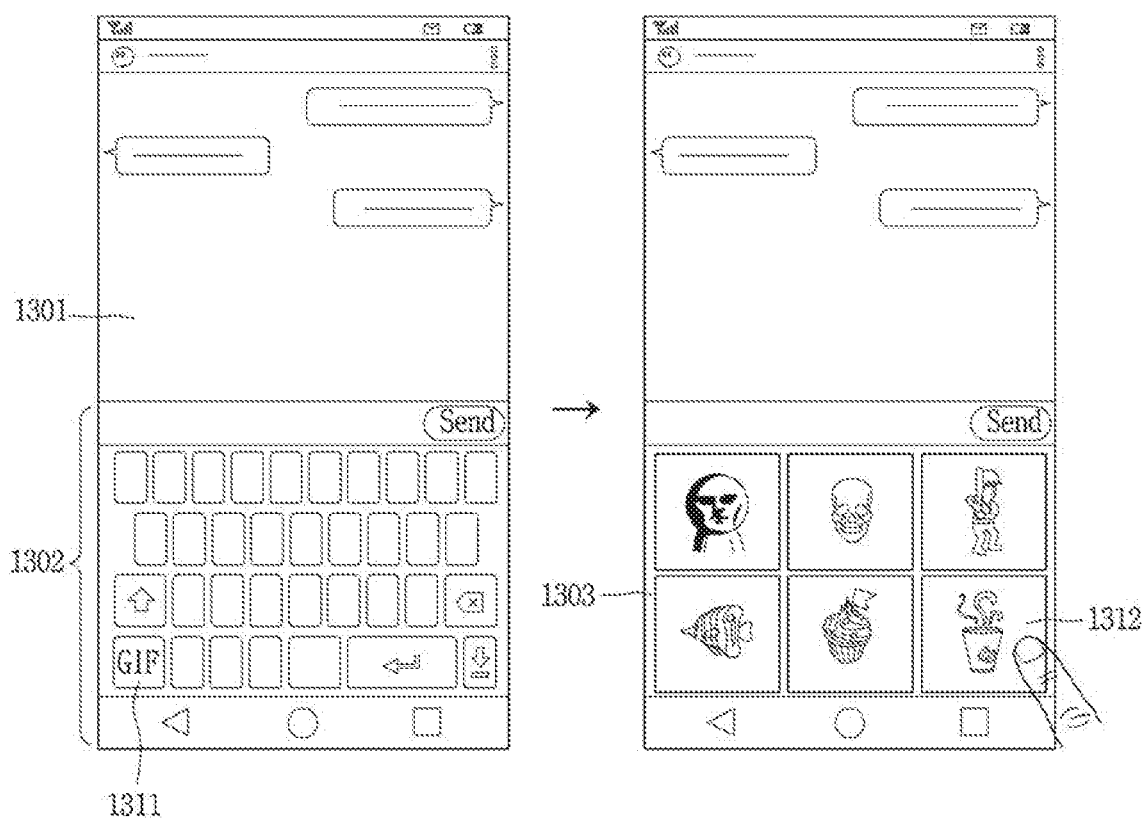

Next, FIG. 13 illustrates an example of providing a key 1311 for inputting a captured moving image as one of keys included in a keyboard area 1302 for inputting a message. In this case, when the corresponding key 1311 is selected, a list 1303 of captured moving images stored in the memory is displayed in the keyboard area 1302. When a specific captured moving image 1312 is selected in the list 1303, the captured moving image is transmitted to a terminal of a counterpart with which the user is chatting.

Figure 14:
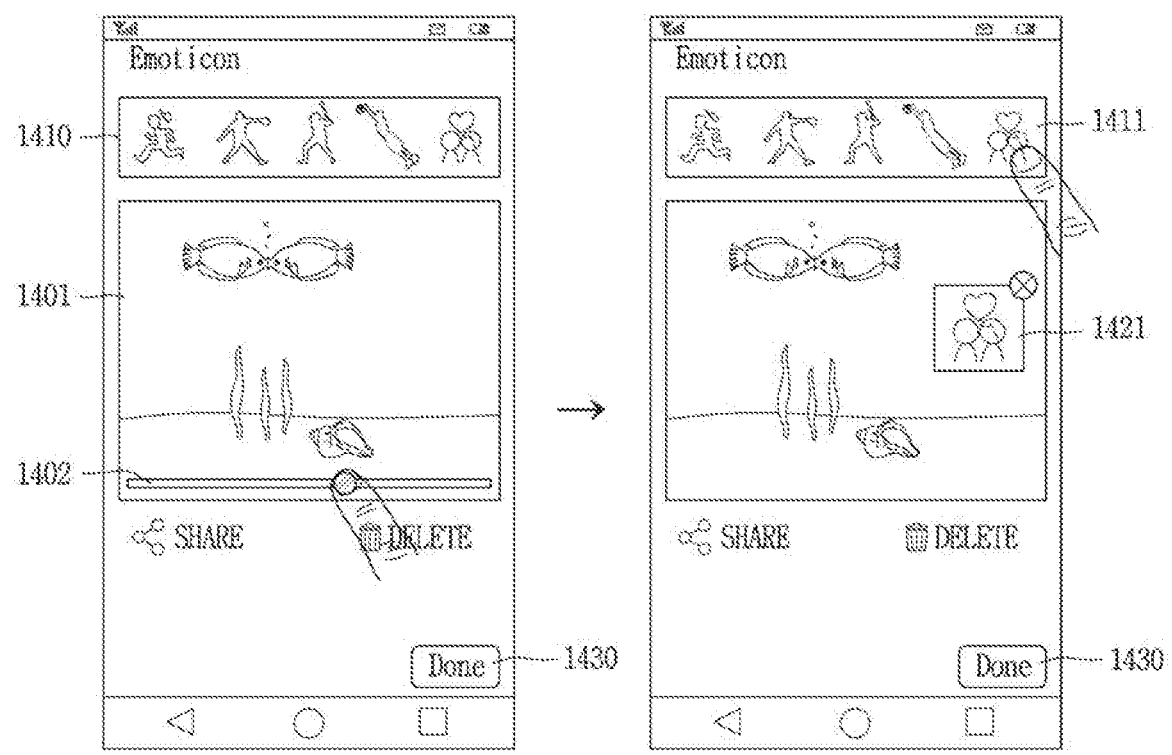

In another example, FIG. 14 illustrates an example of applying a visual effect to a captured moving image when a previously-stored captured moving image is called and transmitted or uploaded. As illustrated in FIG. 14, a control bar 1402 may be used to further control a speed of a captured moving image 1402 before transmitting or uploading the captured moving image 1402. In addition, a specific emoticon 1411 selected in an emoticon area 1410 may be added to a selected point of the captured moving image 1421, and a completion icon 1430 may be selected to transmit the captured moving image to the counterpart terminal or upload the captured moving image to a specific web page or the like.

Figure 15A:
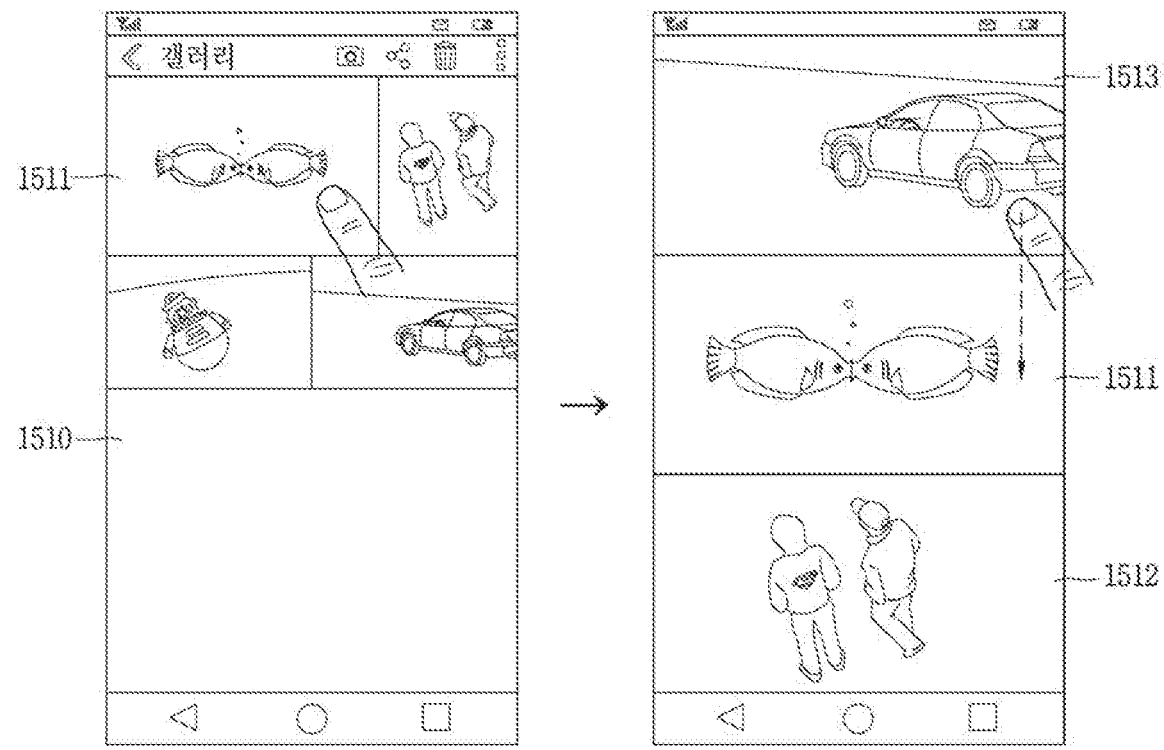
FIGS. 15A, 15B, 15C, and 15D are views illustrating various examples related to a method of displaying a captured moving image in a mobile terminal in accordance with the present invention.
Figure 15B:
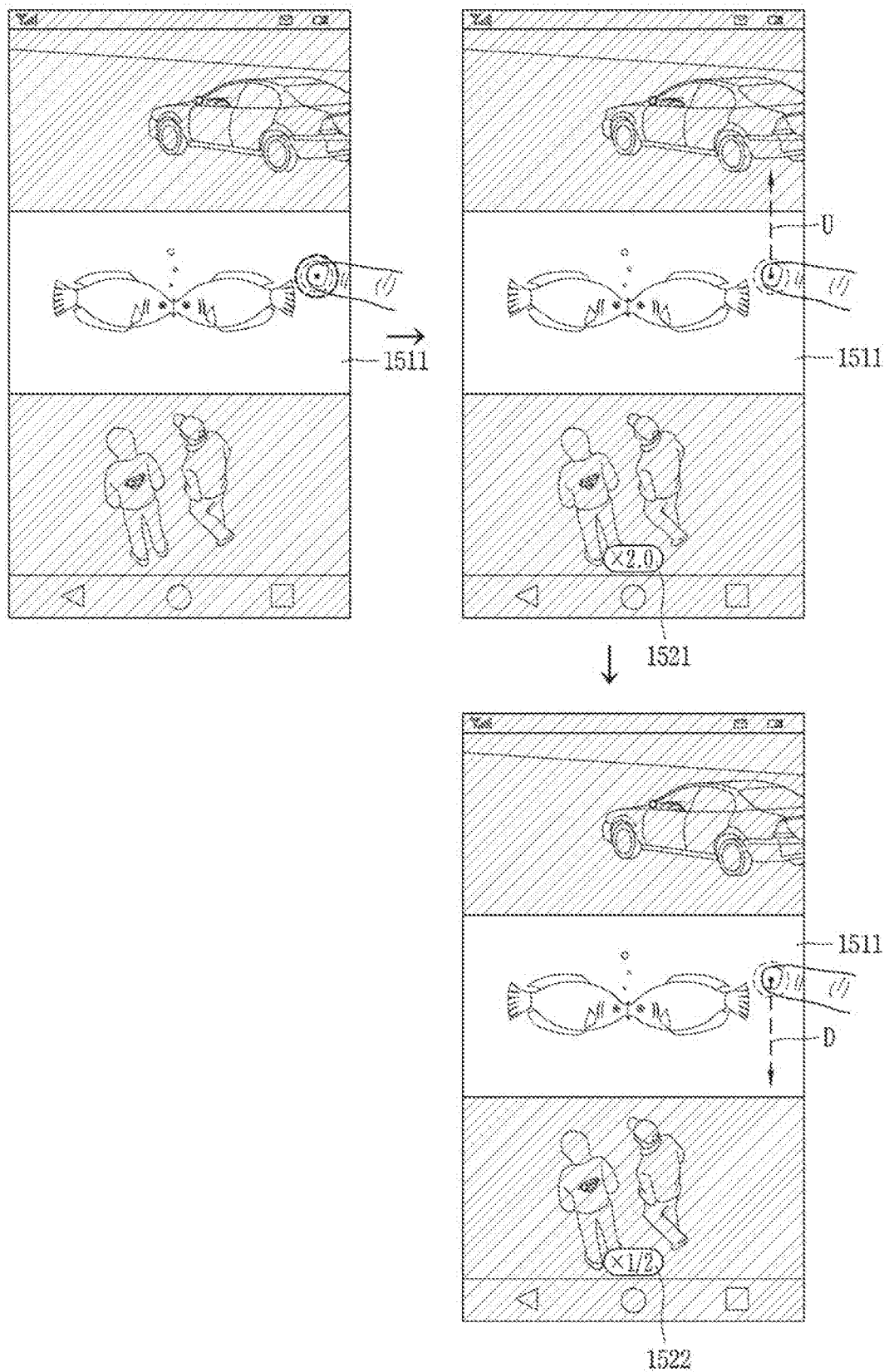
Figure 15C:
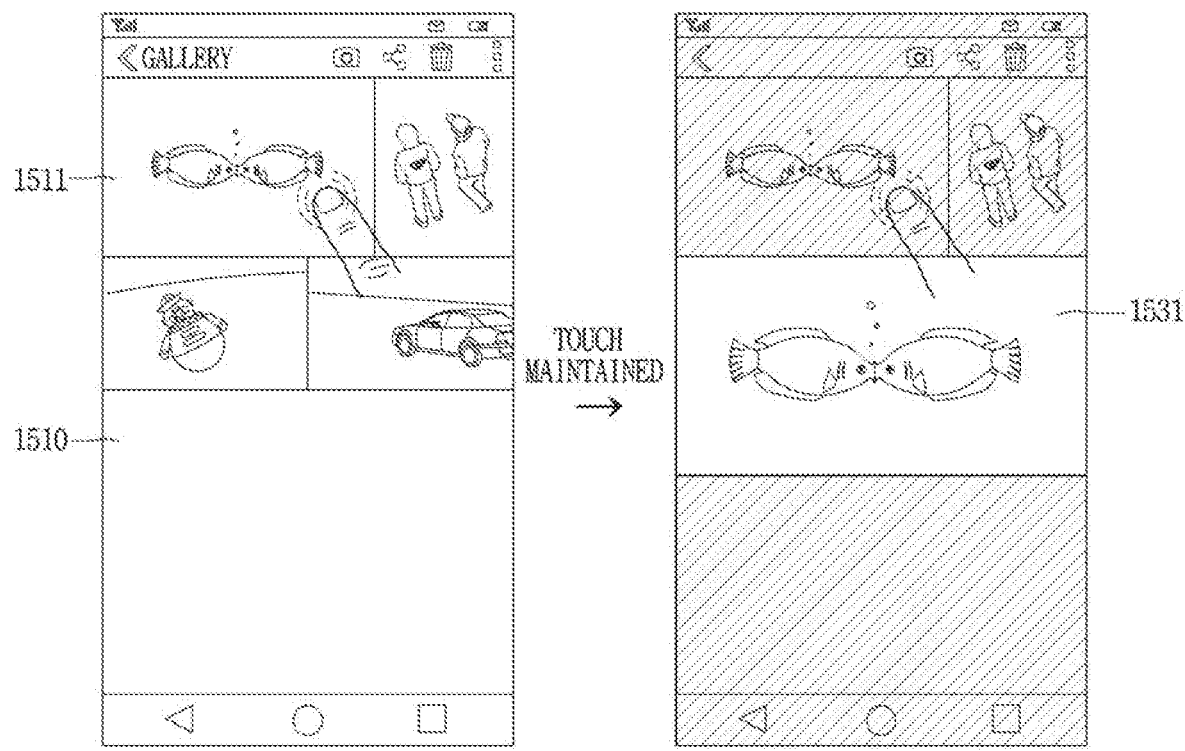

Next, FIGS. 15A, 15B and 15C illustrate various examples related to a method of displaying a captured moving image on an execution screen of a gallery application of the mobile terminal.

First, as illustrated in FIG. 15A, in the gallery application, a list 1510 providing previews of stored captured moving images may be displayed on the display unit 151.

When a specific captured moving image 1511 is selected in the list 1510, a viewing mode of the captured moving image included in the list 1510 is provided in a portrait mode. For example, the selected captured moving image 1511 is repeatedly reproduced on a center of the display unit, and a previous captured moving image 1513 and a next captured moving image 1512 are displayed on upper and lower sides of the display unit 151, respectively, in an inactive state (e.g., a reproduction stop state and/or a monochrome mode).

Accordingly, the user can check the previous or next captured moving image by applying a drag input in the vertical (portrait) direction.

Meanwhile, while the specific captured moving image 1511 is reproduced on the center of the display unit 151, when a touch exceeding reference pressure is applied to an arbitrary point of the captured moving image 1511, the controller 180 executes a function for changing a reproduction speed of the captured moving image 1511.

Accordingly, as illustrated in FIG. 15B, when the touch applied to the arbitrary point of the captured moving image 1511 is dragged up (U), the reproduction speed of the moving image becomes faster and simultaneously information 1521 informing the faster reproduction speed is displayed on a lower side of the display unit 151. Similar to this, when the touch applied to the arbitrary point of the captured moving image 1511 is dragged downward (D), the reproduction speed of the captured moving image becomes slower than before, and simultaneously information 1522 informing the slower speed is displayed on the lower end of the display unit 151.

Also, as illustrated in FIG. 15C, when a long touch input is applied to the specific captured moving image 1511 in the list 1510 providing the previews of the captured moving images, size and position of the corresponding area are varied, and the captured moving image is reproduced on the list while the touch is maintained (1531). At this time, when the touch input applied to the specific captured moving image is released, the previous list 1511 is displayed again.

Figure 15D:
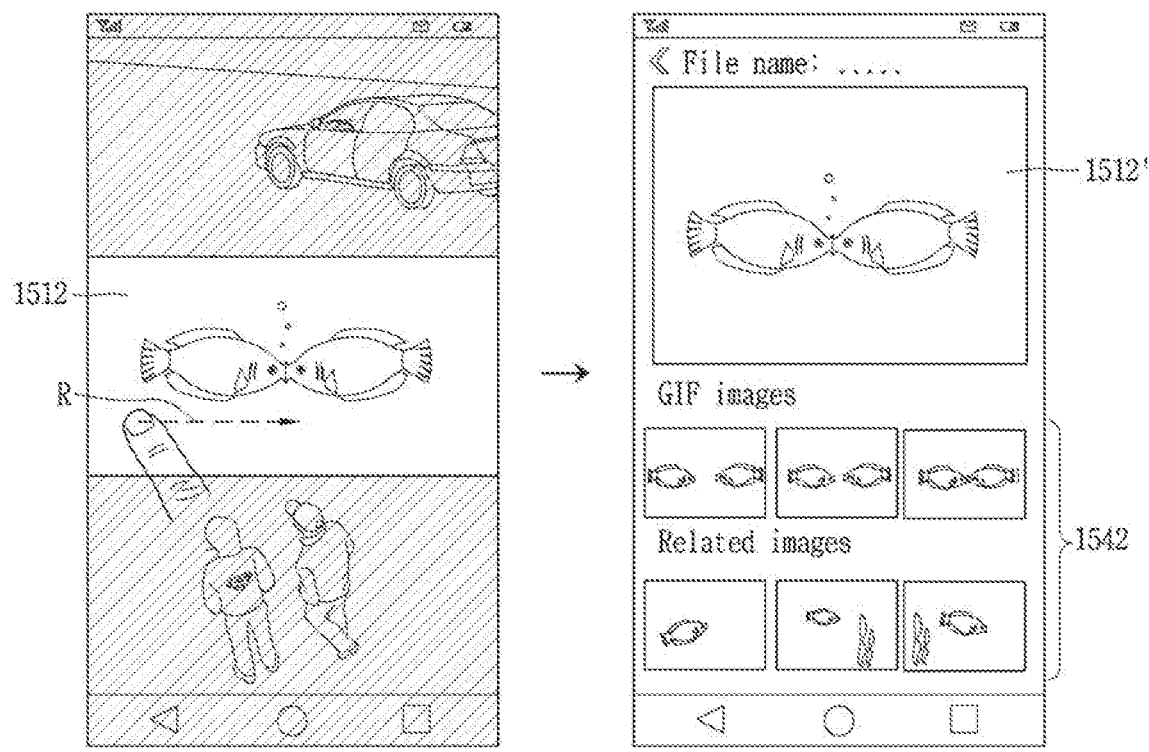

Next, as illustrated in FIG. 15D, when a drag input is applied to the display unit 151 in a horizontal direction while a specific captured moving image 1512 stored in a gallery is displayed, a screen turning effect is applied and simultaneously metadata of a corresponding file may be provided. For example, individual frames, recommended still images, etc., and the like of a captured moving image 1512' may be provided as the metadata 1542. The user can select any one of them to quickly save and share the still images of the captured moving image.

As described above, the mobile terminal according to the embodiment of the present invention can easily and quickly capture a moving image without specifying a capture area separately, and can intuitively capture only a desired moving image section. In addition, during the capture, an object extraction for providing a reproduction speed of the moving image to be captured, a capture time, and options can be performed at the same time, thereby remarkably reducing a time required for the user's effort and editing. In addition, a display method different from a still image display method can be provided according to moving image characteristics, thereby contributing to user convenience.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal, comprising:
a touchscreen; and
a controller configured to:
reproduce first video at a first reproduction speed;
cause the touchscreen to display a first icon for capturing;
in response to a touch input applied to the first icon, generating a second video by capturing at least part of the first video while the touch input is applied to the first icon;
determine a second reproduction speed of the second video corresponding to a degree of the touch input, wherein the degree of the touch input includes a touch intensity of the touch input;
during generating the second video and maintaining the touch input, control the touchscreen to display a graphic object indicating the second reproduction speed together with the first video, wherein the second reproduction speed of the second video is changed based on the touch intensity of the touch input while maintaining the first reproduction speed of the first video;
suspend the capturing while maintaining reproducing the first video, when the touch input applied to the first icon is released;
cause the touchscreen to display a second icon for terminating the capturing after the touch input applied to the first icon is released;
execute an object tracking mode for providing options for the second video, when a second touch is applied to at least one of moving objects included in the first video; and
cause the touchscreen to display a graphic object indicating that each of the moving objects is separated from a background image of the first video, during the capturing of the first video, and the each of moving objects having a same type with the moving object to which the second touch is applied;
identify attribute information related to movement of the each of the moving objects; and
cause applicable options using the attribute information for the each of the moving objects to be displayed on an editing screen of the second video,
wherein the attribute information includes at least one of movement sequence, direction, or change of facial expression of the each of the moving objects.

2. The terminal of claim 1, wherein the controller is further configured to:
cause the touchscreen to display timer information indicating an amount of capturable time of the second video.

3. The terminal of claim 1, wherein the controller is further configured to:
terminate suspending of the generation of the second video, and capture a portion of the first video beginning from a time point of suspending of the generation of the second video, while a further touch is applied to the first icon.

4. The terminal of claim 1, wherein the controller is further configured to:
cause the touchscreen to display a user interface that permits further controlling of the second reproduction speed of the second video based on a touch input applied to the graphic object.

5. The terminal of claim 1, wherein the controller is further configured to:
generate a first file by capturing a first portion of the first video for a first time; and
generate a second file by capturing a second portion of the first video for a second time, wherein the second time begins at an end of the first time.

6. The terminal of claim 5, wherein the controller is further configured to:
cause the touchscreen to display a thumbnail image of the first file while generating the second file.

7. The terminal of claim 6, wherein the controller is further configured to:
suspend generation of the second file and cause the touchscreen to display an editing screen for the first file, when a touch input is applied to the thumbnail image of the first file.

8. The terminal of claim 1, wherein the touchscreen comprises a first area corresponding to a reproduction area of the first video, and a second area corresponding to a preview of the second video; and wherein the controller is further configured to:
identify a start point for further capturing of the first video based on a touch input applied to a reproduction bar of the first video displayed in the first area; and
set a capture time of the first video based on a touch input applied to the first icon displayed in the second area.

9. The terminal of claim 1, wherein the controller is further configured to:
cause the touchscreen to display the editing screen of the second video when the capturing of the first video ends; and
cause the touchscreen to display a first graphic object for adjusting each reproduction time point of the moving objects to be different from an original reproduction time point according to a selection of a first option of the editing screen.

10. The terminal of claim 9, wherein the controller is further configured to:
cause the touchscreen to display the editing screen of the second video when the capturing of the first video ends; and
sequentially set in the editing screen a reproduction order of the moving objects based on the second touch.

11. The terminal of claim 1, wherein the controller is further configured to:
cause the touchscreen to display the editing screen of the second video when the capturing of the first video ends; and
cause the touchscreen to display a second graphic object for adjusting a zoom-in speed of a zooming effect to be applied to a background image of the second video according to a selection of a second option of the editing screen.

12. The terminal of claim 1, wherein the controller is further configured to:
cause the touchscreen to display an option for changing a capturing mode of the first video to a recording mode when a user input associated with an extension of a capture range is received during the capturing.

13. The terminal of claim 1, wherein the controller is further configured to:
vary a reproduction speed of the second video based on a drag direction when a touch input applied to the second video is dragged in either of first and second directions within a reproduction area.

14. The terminal of claim 1, wherein the first icon is a capture icon.

15. The terminal of claim 1, wherein the degree of the touch further includes an amount of contact with the touchscreen.

* * * * *